US012408804B2

(12) United States Patent
Schneider et al.

(10) Patent No.: US 12,408,804 B2
(45) Date of Patent: Sep. 9, 2025

(54) USER FEEDBACK ON POTENTIAL OBSTACLES AND ERROR CONDITIONS DETECTED BY AUTONOMOUS MOBILE ROBOTS

(71) Applicant: iRobot Corporation, Bedford, MA (US)

(72) Inventors: Ryan Schneider, Arlington, MA (US); Shipra Arora, Arlington, VA (US); Hyun Woo Paik, Bedford, MA (US); Benjamin H. Schriesheim, Watertown, MA (US); Lauren D. Stern, Medford, MA (US)

(73) Assignee: iRobot Corporation, Bedford, MA (US)

( * ) Notice: Subject to any disclaimer, the term of this patent is extended or adjusted under 35 U.S.C. 154(b) by 457 days.

(21) Appl. No.: 17/065,441

(22) Filed: Oct. 7, 2020

(65) Prior Publication Data

US 2022/0104675 A1    Apr. 7, 2022

(51) Int. Cl.
*A47L 11/40* (2006.01)
*G05D 1/00* (2024.01)

(52) U.S. Cl.
CPC ....... *A47L 11/4011* (2013.01); *A47L 11/4061* (2013.01); *G05D 1/0016* (2013.01); *G05D 1/0219* (2013.01); *G05D 1/0225* (2013.01); *G05D 1/0238* (2013.01); *A47L 2201/02* (2013.01); *A47L 2201/04* (2013.01); *A47L 2201/06* (2013.01)

(58) Field of Classification Search
CPC .............. A47L 11/4011; A47L 11/4061; A47L 2201/02; A47L 2201/04; A47L 2201/06; G05D 1/0016; G05D 1/0219; G05D 1/0225; G05D 1/0238; G05D 2201/0203
USPC .......................................................... 701/23
See application file for complete search history.

(56) References Cited

U.S. PATENT DOCUMENTS

| 2017/0235312 | A1  |  | 8/2017 | Yoshino |  |
|---|---|---|---|---|---|
| 2018/0055312 | A1 | * | 3/2018 | Jung | ............... G06T 19/006 |
| 2018/0074508 | A1 | * | 3/2018 | Kleiner | ............ G05D 1/0274 |

(Continued)

FOREIGN PATENT DOCUMENTS

| GB |  | 2592414 | A | * | 9/2021 | ............. A47L 11/24 |
|---|---|---|---|---|---|---|
| JP |  | 2016-048474 |  |  | 4/2016 |  |
| JP |  | 2018-156649 |  |  | 10/2018 |  |
| JP |  | 2018-196622 |  |  | 12/2018 |  |
| WO | WO | 2020/060267 |  |  | 3/2020 |  |

(Continued)

OTHER PUBLICATIONS

U.S. Appl. No. 15/863,591, filed Jan. 5, 2018, Jones et al.

(Continued)

*Primary Examiner* — Helal A Algahaim
*Assistant Examiner* — John D Holman
(74) *Attorney, Agent, or Firm* — Fish & Richardson P.C.

(57) ABSTRACT

A mobile computing device includes a user input device and a controller. The user input device includes a display, and the controller is operably connected to the user input device and configured to execute instructions to perform operations. The operations include presenting on the display, information about one or more areas that were not cleaned by an autonomous cleaning robot during a first mission. The operations further include transmitting data corresponding to a user-selected subset of the one or more areas to cause the robot to clean the user-selected subset during a second mission.

12 Claims, 24 Drawing Sheets

(56) References Cited

U.S. PATENT DOCUMENTS

| | | | |
|---|---|---|---|
| 2020/0069140 A1* | 3/2020 | Orzechowski | ....... G05D 1/0022 |
| 2020/0375429 A1 | 12/2020 | Munich et al. | |
| 2021/0089040 A1 | 3/2021 | Ebrahimi et al. | |
| 2021/0093134 A1 | 4/2021 | Kim et al. | |
| 2021/0096560 A1 | 4/2021 | al-Mohssen et al. | |
| 2021/0124354 A1 | 4/2021 | Munich et al. | |

FOREIGN PATENT DOCUMENTS

| | | |
|---|---|---|
| WO | WO 2020/158276 | 8/2020 |

OTHER PUBLICATIONS

U.S. Appl. No. 16/794,855, filed Feb. 19, 2020, Arora et al.
[No Author Listed], "Deebot N79 Instruction Manual," Ecovacs Robotics, Jun. 2018, 80 pages.
[No Author Listed], "Roborock S6 MaxV Robot Vacuum Cleaner User Manual," Roborock Vacuums, Feb. 19, 2020, 39 pages.
[No Author Listed], "Roborock S7 Robot Vacuum Cleaner User Manual," Roborock Vacuums, Feb. 19, 2020, 372 pages.
YouTube.com [Online Video]. "Ecovacs Robotics Deebot Ozmo T8 Aivi Tutorial Video," Published on May 25, 2020, 3:10-3:16, [Retrieved May 6, 2021] Retrieved from the Internet: URL: https://www.youtube.com/watch?v=m40tYaM5j0U, 2 pages.
YouTube.com [Online Video]. "Roborock App In-Depth Overview Jul. 2020—S6 MaxV—S5 Max—S6," Published on Jul. 26, 2020, 20:51-21:55, [Retrieved May 6, 2021] Retrieved from the Internet: URL:https://www.youtube.com/watch?v=kgO3O_MMheI, 3 pages.
International Search Report and Written Opinion in International Appln. No. PCT/US2021/045786, dated Jan. 20, 2022, 20 pages.
Invitation to Pay Additional Fees in International Appln. No. PCT/US2021/045786, dated Nov. 17, 2021, 15 pages.
International Preliminary Report on Patentability in International Appln. No. PCT/US2021/045786, mailed Apr. 20, 2023, 12 pages.

* cited by examiner

USER FEEDBACK ON POTENTIAL OBSTACLES AND ERROR CONDITIONS DETECTED BY AUTONOMOUS MOBILE ROBOTS

TECHNICAL FIELD

This specification relates to the acquisition and use of user feedback on obstacles detected by autonomous mobile robots and related systems and methods.

BACKGROUND

Autonomous mobile robots include autonomous cleaning robots that autonomously perform cleaning tasks within an environment, e.g., a home. Many kinds of cleaning robots are autonomous to some degree and in different ways. A cleaning robot can include a controller configured to autonomously navigate the robot about an environment such that the robot can ingest debris as it moves. The cleaning robot can include a sensor for avoiding obstacles in the environment.

SUMMARY

An autonomous mobile robot can detect potential obstacles and/or error conditions while operating in an environment (e.g., while performing a cleaning mission). The autonomous mobile robot can provide a user with information about the detected potential obstacles and/or error conditions, and receive user feedback on the detected potential obstacles and/or error conditions. The present disclosure describes various ways that user feedback on detected potential obstacles and/or error conditions can be obtained and used in operations of the robot. When the robot detects a potential obstacle and/or error condition, the robot can send information about the potential obstacle and/or error condition to a mobile computing device of the user. For example, the information can include data representing a classification of the detected potential obstacle or type of error condition, a location of the robot at the time of detecting the potential obstacle and/or error condition, and imagery captured by the robot at the time of detecting the potential obstacle and/or error condition.

The mobile computing device can receive the information sent by the robot and present at least a portion of the information on a display. In some cases, the mobile computing device can solicit feedback from the user. For example, the mobile computing device can present, on the display, options that can be selected by the user to provide the feedback for controlling the autonomous mobile robot's interactions with the potential obstacle, a region where the potential obstacle is located, or a region where the error condition was detected. For example, the user could select an option to instruct the autonomous mobile robot to clean the region (e.g., because the obstacle or the source of the error condition has been addressed by the user) or avoid the region (e.g., because the obstacle or the source of the error condition has not been or cannot be addressed by the user). The user-selectable options can also be used to provide feedback to the robot on whether or not the detected potential obstacle and/or error condition is a true obstacle and/or error condition. For example, in some cases, obstacles and/or error conditions detected by the robot are potential obstacles and/or potential error conditions that can be reviewed by the user to identify if they are true obstacles and/or true error conditions. If they are not true obstacles and/or error conditions, the user can provide feedback to denote the absence of an obstacle and/or error condition.

In some examples, an autonomous mobile robot can detect one or more obstacles during a first cleaning mission, resulting in one or more areas not being cleaned by the autonomous cleaning robot during the first cleaning mission. After receiving user feedback on the one or more obstacles or areas, the robot can then perform a second cleaning mission. In some cases, the second cleaning mission can be a tidy-up mission in which the autonomous cleaning robot maneuvers relative to the one or more obstacles or areas based on the user feedback. For example, the user feedback on the one or more obstacles or areas can include a user-selected subset of the one or more areas that should be cleaned by the robot in the tidy-up mission (e.g., because an obstacle was removed or because a detected potential obstacle was not a true obstacle).

Advantages of the foregoing may include, but are not limited to, those described below and herein elsewhere.

Implementations described herein can improve the experience for users in interacting with autonomous mobile robots. Imagery captured by the autonomous mobile robot when an obstacle and/or error condition is detected can provide information to the user about the environment of the robot. For example, the imagery may help a user to understand why one or more areas of the environment were not cleaned by the robot during a cleaning mission. In some implementations, presenting multiple user-selectable options on a display can give the user an intuitive way to interact with and provide feedback to the robot, particularly with respect to potential obstacles and error conditions detected during a cleaning mission.

Implementations described herein can also improve the coverage of the robot within the environment and the performance of the robot in future cleaning missions. For example, the plurality of user-selectable options enable the user to provide valuable user feedback to the robot. In some examples, the user feedback can provide information that is not captured by one or more sensors of the robot. The user feedback can also help a robot to process and interpret data that is captured by the one or more sensors of the robot. In some examples, the user feedback can inform the robot that an obstacle has been removed, causing the robot to clean an area during a tidy-up mission that was not cleaned during a first cleaning mission. In some examples, the user feedback can be used to create a keep-out zone, which can decrease the probability of a robot experiencing an error condition in future cleaning missions. In some examples, the user feedback can inform the robot if a detected potential obstacle is a true obstacle, which can improve the robot's detection of obstacles in future cleaning missions. In some examples, a user can opt to contribute data about potential obstacles, error conditions, and related user feedback to a database, which can be used to improve the performance of a wide range of autonomous mobile robots owned by various users.

Implementations described herein can also improve the efficiency of a cleaning mission performed by the robot. For example, a tidy-up mission performed based on user feedback about potential obstacles and/or error conditions can enable the robot to efficiently clean regions that were not cleaned during a first cleaning mission while limiting re-cleaning of regions that were already cleaned during the first cleaning mission. In some cases, the regions that were not cleaned during the first cleaning mission may otherwise have gone uncleaned and may not have been cleaned in subsequent missions. The tidy-up mission can provide a mechanism to ensure that such regions are cleaned.

In one aspect, a mobile computing device includes a user input device and a controller operably connected to the user input device. The user input device includes a display, and the controller is configured to execute instructions to perform operations. The operations include presenting on the display, information about one or more areas that were not cleaned by an autonomous cleaning robot during a first mission. The operations further include transmitting data corresponding to a user-selected subset of the one or more areas to cause the autonomous cleaning robot to clean the user-selected subset during a second mission.

Implementations can include one or more features below or described herein elsewhere. Implementations can include combinations of the below features.

In some implementations, the information about the one or more areas can include a location of an individual one of the one or more areas. In some implementations, the information about the one or more areas can include data indicative of a potential obstacle detected in an individual one of the one or more areas. In some implementations, the data indicative of the potential obstacle detected in the individual one of the one or more areas can include one or more images of the potential obstacle, and in some implementations, the operations can further include presenting a representation of the one or more images of the potential obstacle on the display. In some implementations, the data indicative of the potential obstacle detected in the individual one of the one or more areas can include a label denoting a classification of the potential obstacle. In some implementations, the operations can further include presenting, for an individual one of the one or more areas, affordances corresponding to a plurality of user-selectable options of the display. In some implementations, the operations can further include transmitting, for the individual one of the one or more areas, data corresponding to a user-selection of one of the plurality of user-selectable options to the autonomous cleaning robot to maneuver the robot relative to the one or more areas during the second mission. In some implementations, the plurality of user-selectable options can include a first option to maneuver the autonomous cleaning robot to clean the individual one of the one or more areas and a second option to maneuver the autonomous cleaning robot to avoid the individual one of the one or more areas. In some implementations, the plurality of user-selectable options can include an option to indicate an absence of an obstacle in the individual one of the one or more areas. In some implementations, the plurality of user-selectable options can include an option to maneuver the autonomous cleaning robot to avoid the individual one of the one or more areas during the second mission, but not during one or more missions subsequent to the second mission. In some implementations, the plurality of user-selectable options can include an option to maneuver the autonomous cleaning robot to avoid the individual one of the one or more areas during the second mission and during one or more missions subsequent to the second mission. In some implementations, the affordances corresponding to the plurality of user-selectable options can be presented on the display after completion of the first mission. In some implementations, the second mission can be initiated within 12 hours of a completion of the first mission. In some implementations, the operations can further include presenting an affordance corresponding to a contribution option on the display, the contribution option enabling the mobile computing device to transmit the information about the one or more areas and the data corresponding to the user-selected subset to a database storing data from multiple users. In some implementations, the operations can further include presenting on the display, a map of an environment including the one or more areas. In some implementations, the operations can further include, presenting on the display, information about the user-selected subset after completion of the second mission. In some implementations, the first mission and the second mission can be consecutive missions. In some implementations, the second mission can include (i) the autonomous cleaning robot initiating movement from a dock to a first area of the user-selected subset, (ii) the autonomous cleaning robot initiating movement to all remaining areas of the user-selected subset, and (iii) the autonomous cleaning robot initiating movement from a last area of the user-selected subset to the dock. In some implementations, the autonomous cleaning robot can clean the user-selected subset during the second mission without cleaning an entirety of regions cleaned by the autonomous cleaning robot during the first mission.

In another aspect, an autonomous cleaning robot includes a drive system, an obstacle detection sensor, and a controller operably connected to the drive system and the obstacle detection sensor. The drive system supports the autonomous cleaning robot above a floor surface and is operable to maneuver the robot about the floor surface. The obstacle detection sensor can detect a potential obstacle as the autonomous cleaning robot is maneuvered about the floor surface, and the controller is configured to execute instructions to perform operations. The operations include performing a first mission and detecting one or more potential obstacles in one or more areas on the floor surface during the first mission. The operations further include transmitting, to a mobile computing device, data corresponding to the detected potential obstacles and the one or more areas. The operations further include receiving, from the mobile computing device, data corresponding to a user-selected subset of the one or more areas, and performing a second mission to clean the user-selected subset of the one or more areas.

Implementations can include one or more features below or described herein elsewhere. Implementations can include combinations of the below features.

In some implementations, the obstacle detection sensor can include an image capture device positioned on the autonomous cleaning robot to capture imagery of a portion of the floor surface forward of the autonomous cleaning robot. In some implementations, the data corresponding to the detected potential obstacles and the one or more areas can include data representing imagery of an individual one of the one or more detected potential obstacles. In some implementations, the imagery can include a single image, and in some implementations, the imagery can include a series of images. In some implementations, the data corresponding to the detected potential obstacles and the one or more areas can include a location of an individual one of the one or more areas. In some implementations, the data corresponding to the detected potential obstacles and the one or more areas can include a label denoting a classification of an individual one of the detected potential obstacles. In some implementations, the second mission can be initiated within 12 hours of a completion of the first mission. In some implementations, the operations can further include transmitting, to the mobile computing device, data corresponding to an updated status of the user-selected subset of the one or more areas during the second mission. In some implementations, the data corresponding to the updated status of the user-selected subset can include an indication of a portion of the user-selected subset that was cleaned during the second mission. In some implementations, the data corresponding to the user-selected subset of the one or more areas can include, for an individual one of the one or more areas, data corresponding to a user-selection of one of a plurality of user-selectable options. In some implementations, the plurality of user-selectable options can include a first option to cause the autonomous cleaning robot to clean the individual one of the one or more areas during the second mission and a second option to cause the autonomous cleaning robot to avoid the individual one of the one or more areas during the second mission. In some implementations, the plurality of user-selectable options can include an option to cause the autonomous cleaning robot to avoid the individual one of the one or more areas during the second mission, but not during one or more missions subsequent to the second mission. In some implementations, the plurality of user-selectable options can include an option to cause the autonomous cleaning robot to avoid the individual one of the one or more areas during the second mission and during one or more missions subsequent to the second mission. In some implementations, the plurality of user-selectable options can include an option to indicate an absence of an obstacle in the individual one of the one or more areas. In some implementations, the operations can further include updating an obstacle detection module based on the user-selection. In some implementations, the first mission and the second mission can be consecutive missions. In some implementations, performing the second mission can include (i) initiating movement from a dock to a first area of the user-selected subset, (ii) initiating movement to all remaining areas of the user-selected subset, and (iii) initiating movement from a last area of the user-selected subset to the dock. In some implementations, the second mission can include cleaning the user-selected subset of the one or more areas without cleaning an entirety of regions cleaned by the autonomous cleaning robot during the first mission.

In a further aspect, a mobile computing device includes a user input device and a controller operably connected to the user input device. The user input device includes a display, and the controller is configured to execute instructions to perform operations. The operations include receiving, from an autonomous cleaning robot, data corresponding to a detected error condition of the autonomous cleaning robot, and a portion of imagery captured by the autonomous cleaning robot. The portion of the imagery is associated with the detected error condition. The operations further include responsive to receiving the data corresponding to the detected error condition, presenting a representation of the portion of the imagery on the display and an indicator of the detected error condition.

Implementations can include one or more features below or described herein elsewhere. Implementations can include combinations of the below features.

In some implementations, the portion of the imagery being associated with the error condition can be captured proximate to a location of the autonomous cleaning robot when the autonomous cleaning robot detects the error condition. In some implementations, the portion of the imagery can include images captured prior to the autonomous cleaning robot detecting the error condition, and in some implementations, the portion of the imagery can include images captured subsequent to the autonomous cleaning robot detecting the error condition. In some implementations, the portion of the imagery being associated with the error condition can include a single image, and in some implementations, the portion of the imagery being associated with the error condition can include a sequence of images. In some implementations, the data corresponding to the detected error condition can include at least one of a location of the autonomous cleaning robot when the autonomous cleaning robot detects the error condition, a time when the autonomous cleaning robot detects the error condition, or a type of error condition. In some implementations, the type of error condition can be associated with a component of the autonomous cleaning robot, and the component can include at least one of a drive system, a cleaning assembly, or a brush. In some implementations, the component can be identified for replacement. In some implementations, the type of error condition can be associated with a limited mobility of the autonomous cleaning robot, and in some implementations, the limited mobility of the autonomous cleaning robot can include an inability to complete a mission or an inability to navigate to a dock. In some implementations, the portion of imagery can include imagery captured of a portion of an environment forward of the autonomous cleaning robot. In some implementations, the portion of the environment forward of the autonomous cleaning robot can include a portion of a floor surface. In some implementations, the indicator of the detected error condition can include a label of a type of error condition, and in some implementations, the indicator of the detected error condition can include a representation of a location of the autonomous cleaning robot when the autonomous cleaning robot detects the error condition.

In a further aspect, an autonomous cleaning robot includes a drive system to support the autonomous cleaning robot above a floor surface, the drive system being operable to maneuver the autonomous cleaning robot about the floor surface. The autonomous cleaning robot further includes one or more sensors configured to capture sensor data corresponding to an error condition of the autonomous cleaning robot and an image capture device to capture imagery associated with the error condition. The imagery can be of a portion of an environment forward of the autonomous cleaning robot. The autonomous cleaning robot further includes one or more controllers operably connected to the drive system, the image capture device, and the one or more sensors, the one or more controllers being configured to execute instructions to perform operations. The operations include detecting the error condition of the autonomous cleaning robot based on the sensor data as the autonomous cleaning robot is maneuvered about the floor surface. The operations further include transmitting, to a mobile computing device, (i) information about the detected error condition to cause the mobile computing device to present an indicator of the error condition and (ii) data representing a portion of the captured imagery to cause the mobile computing device to present a representation of the portion of the captured imagery.

Implementations can include one or more features below or described herein elsewhere. Implementations can include combinations of the below features.

In some implementations, the portion of the environment forward of the autonomous cleaning robot can include a portion of the floor surface. In some implementations, the portion of the captured imagery can be captured at a location of the autonomous cleaning robot when the autonomous cleaning robot detects the error condition. In some implementations, the portion of the captured imagery can include a single image, and in some implementations, the portion of the captured imagery can include a sequence of images. In some implementations, the information about the error condition can include at least one of a location of the autonomous cleaning robot when the autonomous cleaning robot detects the error condition, a time when the autonomous cleaning robot detects the error condition, or a type of error condition. In some implementations, the type of error condition can be associated with a component of the autonomous cleaning robot, and the component can be at least one of a drive system, a cleaning assembly, or a brush. In some implementations, the component can be identified for replacement. In some implementations, the type of error condition can be associated with a limited mobility of the autonomous cleaning robot, and in some implementations, the limited mobility of the autonomous cleaning robot can include an inability to complete a mission or an inability to navigate to a dock.

The details of one or more implementations of the subject matter described in this specification are set forth in the accompanying drawings and the description below. Other potential features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
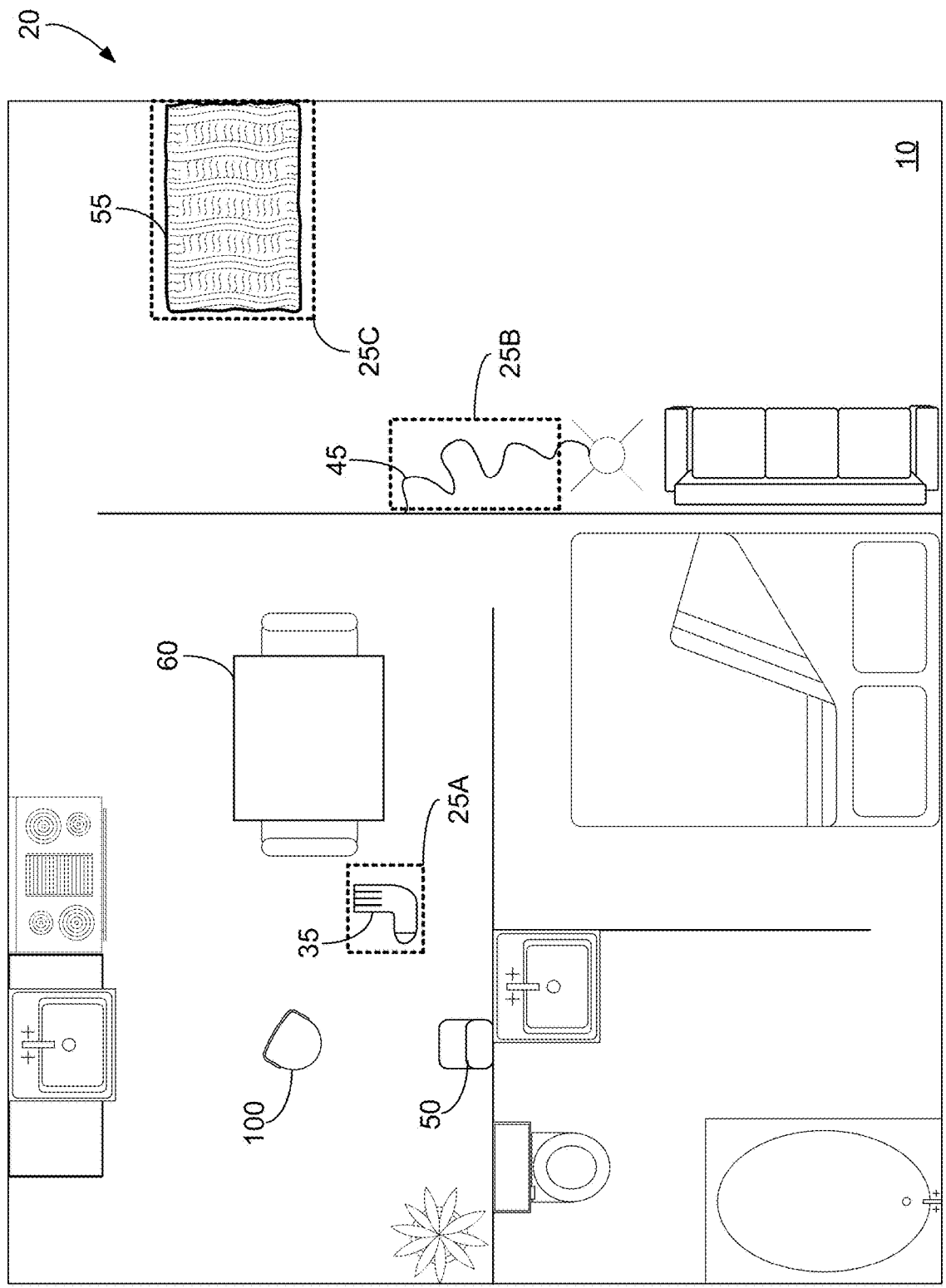
FIGS. 1A-1B are top views of an example of an environment including an autonomous mobile robot.

Referring to FIG. 1A, an autonomous mobile robot 100 moves about a floor surface 10 in an environment 20. For example, the environment 20 can be a home with a kitchen, a dining room, a bathroom, a bedroom, and a living room. The robot 100 is a cleaning robot, e.g., a robot vacuum, a robot mop, or other cleaning robot, that can clean the floor surface 10 as the robot 100 navigates about the floor surface 10. The robot 100 can perform various missions, which can include training missions and cleaning missions. During a training mission, the robot navigates about the floor surface 10 without cleaning the floor surface 10. During a cleaning mission, the robot 100 navigates about the floor surface 10 to clean one or more areas of the environment 20. The areas can be determined automatically by the robot 100 or can be pre-defined by a user. At the start of the cleaning mission, the robot 100 may be docked at a docking station 50 (sometimes referred to as a dock), or may be located elsewhere in the environment 20. A cleaning mission can be considered complete after the robot 100 has finished navigating, or attempting to navigate, to various areas in the environment 20, when a user manually terminates the cleaning mission, or when the robot 100 experiences an error condition. In some implementations, the cleaning mission is not considered complete until the robot 100 has navigated, or attempted to navigate to the various areas a threshold number of times (e.g., twice, three times, etc.). In some implementations, the cleaning mission is not considered complete until the robot detects an amount of debris less than a threshold amount of debris in at least a portion of the various areas. The cleaning mission can also include the robot 100 returning to a docking station 50, in the middle of the cleaning mission or at the end of the cleaning mission. In some implementations, the cleaning mission can be considered complete if the robot 100 determines that it cannot navigate to the docking station 50. The docking station 50 can charge the robot 100. In examples in which the robot 100 is a robot vacuum that collects debris as the robot 100 travels around the environment, in some implementations, the docking station 50 also evacuates debris from the robot 100 to allow the robot 100 to collect additional debris. Upon completion of a cleaning mission, the robot 100 stops navigating about and cleaning the floor surface 10, until initiation of the next cleaning mission.

As described in this disclosure, during a first cleaning mission, the robot 100 can detect potential obstacles in one or more areas of the environment 20. For example, the robot 100 may detect a sock 35 as a potential obstacle in a first area 25A of the floor surface 10; the robot 100 may detect a cord 45 as a potential obstacle in a second area 25B of the floor surface 10; and the robot 100 may detect a rug 55 as a potential obstacle in a third area 25C of the floor surface 10. In some implementations, potential obstacles are detected by processing images captured by an image capture device of the robot 100 (e.g., a front-facing camera). For example, images captured by the image capture device of the robot 100 can be input to an object detection module 190 (shown in FIG. 4A) of the robot 100 for detecting objects within the images (e.g., using image analysis techniques, one or more convolutional neural networks, etc.). Examples of obstacle detection techniques that can be performed by, or in conjunction with, the robot 100 are described in U.S. application Ser. No. 15/863,591, filed on Jan. 5, 2018, the entire contents of which are incorporated by reference.

In some implementations, to avoid getting stuck or experiencing an error condition, the robot 100 can avoid cleaning the first area 25A, the second area 25B, and the third area 25C (jointly referred to as areas 25) during the first cleaning mission. In some implementations, in response to detecting a potential obstacle, the robot can change its behavior (e.g., shut off a vacuum, slow down, turn on a light to indicate that an obstacle has been detected, etc.). The robot 100 can send information about the areas 25, the potential obstacles associated with the areas 25, etc. to a mobile computing device of a user. The information can include locations of the areas 25, an image of the associated potential obstacles, and a classification of the potential obstacles. In some cases, the robot can send information about only certain types of potential obstacles (e.g., small obstacles, obstacles that are likely to cause error conditions, obstacles easily removable from the floor surface 10 by the user, etc.). For example, the robot 100 may send information about a sock 35, but not about a dining table 60, even though the dining table 60 may also prevent the robot 100 from cleaning a portion of the floor surface 10.

The mobile computing device can present, on a display, affordances corresponding to user-selectable options for each of the areas 25. The user-selectable options (further described in relation to FIGS. 9A-9D) enable the user to provide feedback to the robot 100 about each of the areas 25 and/or the potential obstacles detected in the areas 25. For example, if the user has picked up the sock 35, the user can provide feedback to cause the robot to clean the area 25A during a second cleaning mission. Alternatively, if the user in unable or unwilling to pick up the sock 35 prior to the start of a second cleaning mission, the user can provide feedback to cause the robot 100 to avoid the area 25A during the second cleaning mission. In the case of more permanent obstacles, the user may provide feedback to the robot 100 to set up a keep-out zone. For example, if the user does not intend to move the cord 45 for a substantial period of time, the user can provide feedback to set up a keep-out zone around area 25B, causing the robot 100 to avoid the area 25B not only during the second cleaning mission but also during cleaning missions subsequent to the second cleaning mission. In addition, the user can provide feedback denoting the absence of an obstacle in a particular area. For example, if the robot 100 detects the rug 55 as a potential obstacle because it incorrectly identifies a pattern of the rug 55 as a cord, then the user can provide feedback to specify that there actually is no obstacle at area 25C. This feedback can cause the robot 100 to clean the area 25C during a second cleaning mission and can also cause an object detection module 190 (shown in FIG. 4A) of the robot 100 to be updated (e.g. to reduce false detection of potential obstacles in future cleaning missions). In some cases, the user can choose to contribute data about each of the areas 25, the detected potential obstacles, and/or the user feedback to a database storing data from multiple users (described in further detail herein).

Figure 1B:
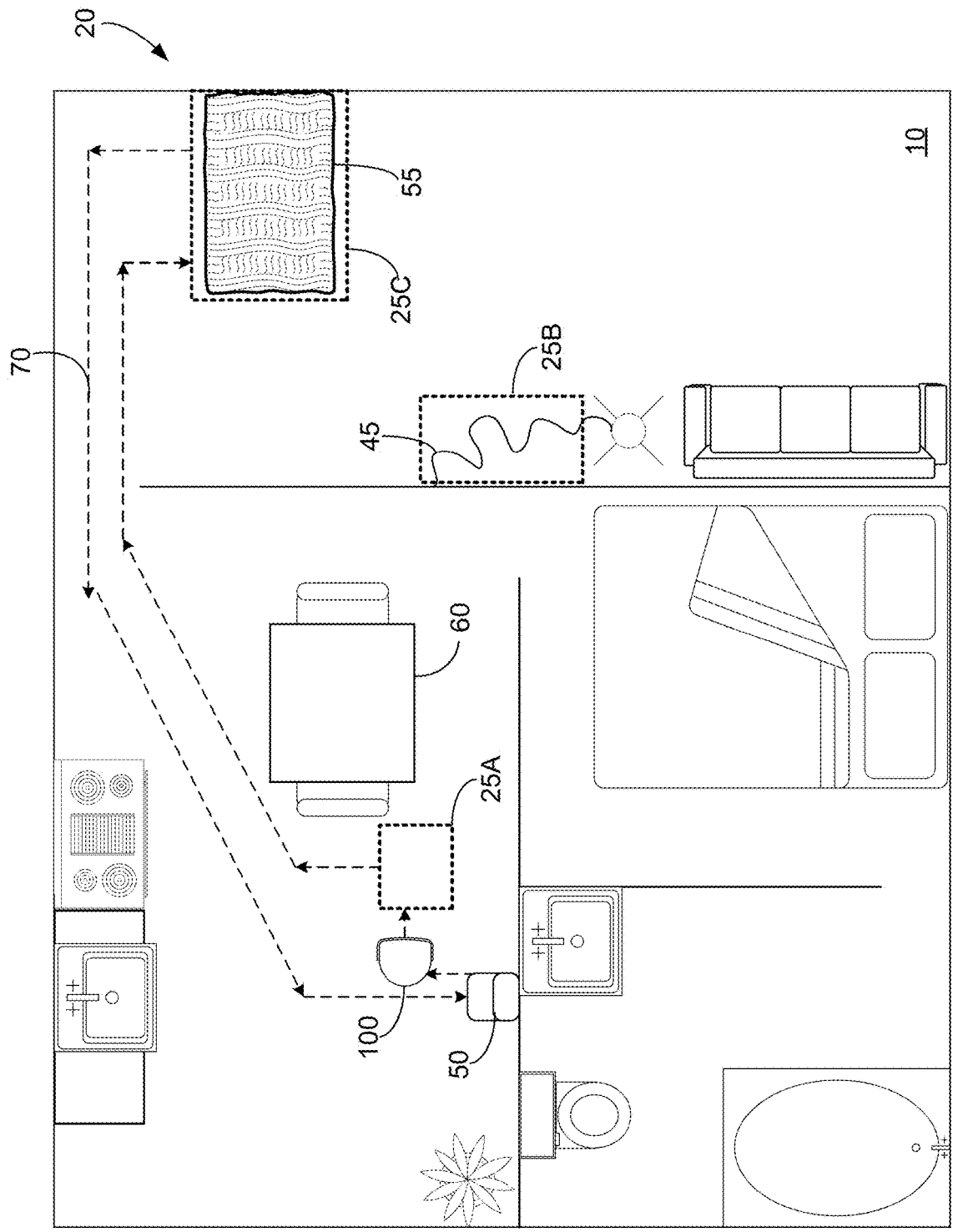

Referring to FIG. 1B, after receiving feedback from the user, the robot 100 can perform a second cleaning mission. In some cases, the second cleaning mission can be a tidy-up mission. During the tidy-up mission, the robot 100 can clean a subset of the areas 25 that were not cleaned during the first cleaning mission. For example, based on the user feedback, the robot 100 can clean area 25A and area 25C while avoiding area 25B. In this example, the user provides feedback to the robot 100 indicating the (i) removal of the sock 35 from area 25A, (ii) a designation of area 25B as a keep-out zone, and (iii) an absence of an obstacle in area 25C. In response to receiving the user feedback, the robot 100 navigates about the floor surface 10 following a trajectory 70 during the tidy-up mission. The robot 100 starts the tidy-up mission by initiating movement from the docking station 50 to the area 25A. The sock 35 is no longer present in the area 25A because the user has moved it, allowing the robot 100 to clean the area 25A. After cleaning the area 25A, the robot 100 initiates movement to area 25C. The user has provided feedback specifying the absence of an obstacle in the area 25C, so the robot cleans area 25C despite previously identifying a potential obstacle in the area 25C. After cleaning area 25C, the robot 100 initiates movement from the area 25C to the docking station 50, thereby completing the tidy-up mission. The robot 100 does not attempt to navigate to the area 25B because the user has provided feedback that causes the area 25B to be designated as a keep-out zone. Moreover, during the tidy-up mission, the robot cleans areas 25A and 25C without cleaning an entirety of regions already cleaned by the robot 100 during the first cleaning mission. Consequently, the tidy-up mission can save time and energy compared to a second cleaning mission wherein the robot 100 attempts to clean the entire floor surface 10.

Example Autonomous Mobile Robots

Examples of autonomous mobile robots are described in U.S. application Ser. No. 16/588,295, filed on Sep. 30, 2019, the entire contents of which are incorporated by reference.

Figure 2:
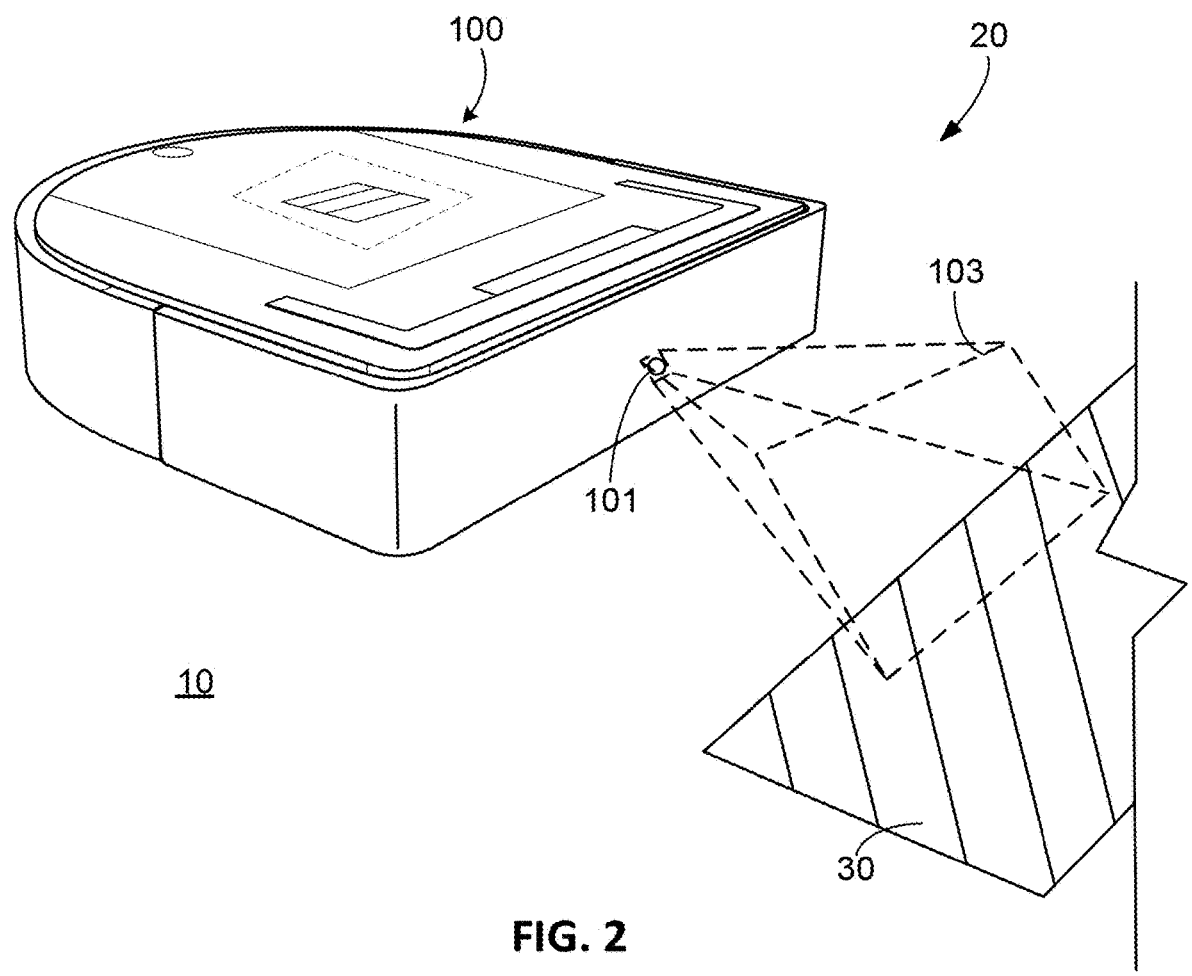
FIG. 2 is a perspective view of an autonomous cleaning robot in an environment.

Referring to FIG. 2, the autonomous mobile robot 100, e.g., an autonomous cleaning robot, on a floor surface 10 in an environment 20, includes an image capture device 101 configured to capture imagery of the environment 20. In particular, the image capture device 101 is positioned on a forward portion of the robot 100. A field of view 103 of the image capture device 101 covers at least a portion of the floor surface 10 ahead of the robot 100. The image capture device 101 can capture imagery of an object on the portion of the floor surface 10. For example, as depicted in FIG. 2, the image capture device 101 can capture imagery representing at least a portion of a rug 30 on the floor surface 10. The imagery can be used by the robot 100 for navigating about the environment 20 and can, in particular, be used by the robot 100 to navigate relative to the rug 30 so that the robot 100 avoids error conditions that can potentially be triggered as the robot 100 moves over the rug 30. For example, the imagery can be used as input to an object detection module 190 (shown in FIG. 4A) that processes the imagery (e.g., executes image processing operations on data representing the imagery) to identify potential obstacles on the floor surface 10 such as clothing, electrical cords, backpacks, etc.

Figure 3:
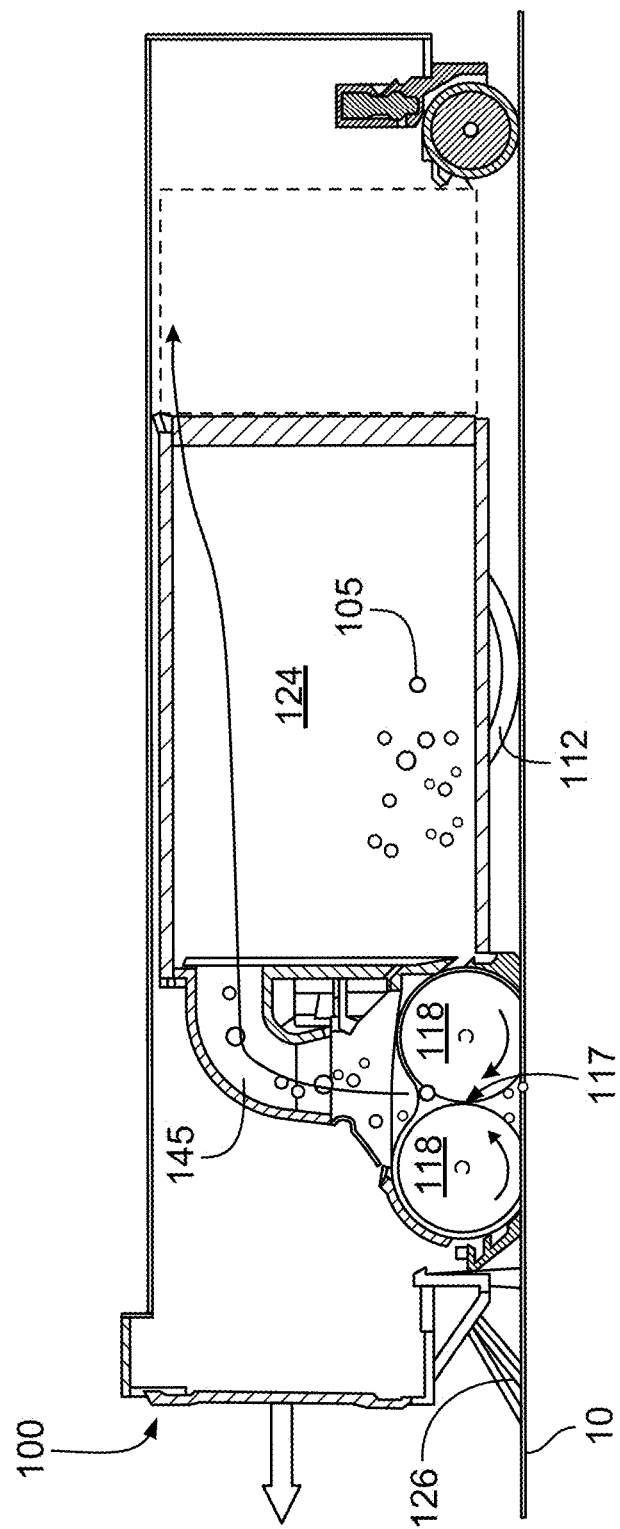
FIG. 3 is a side schematic view of an autonomous cleaning robot in an environment.
Figure 4A:
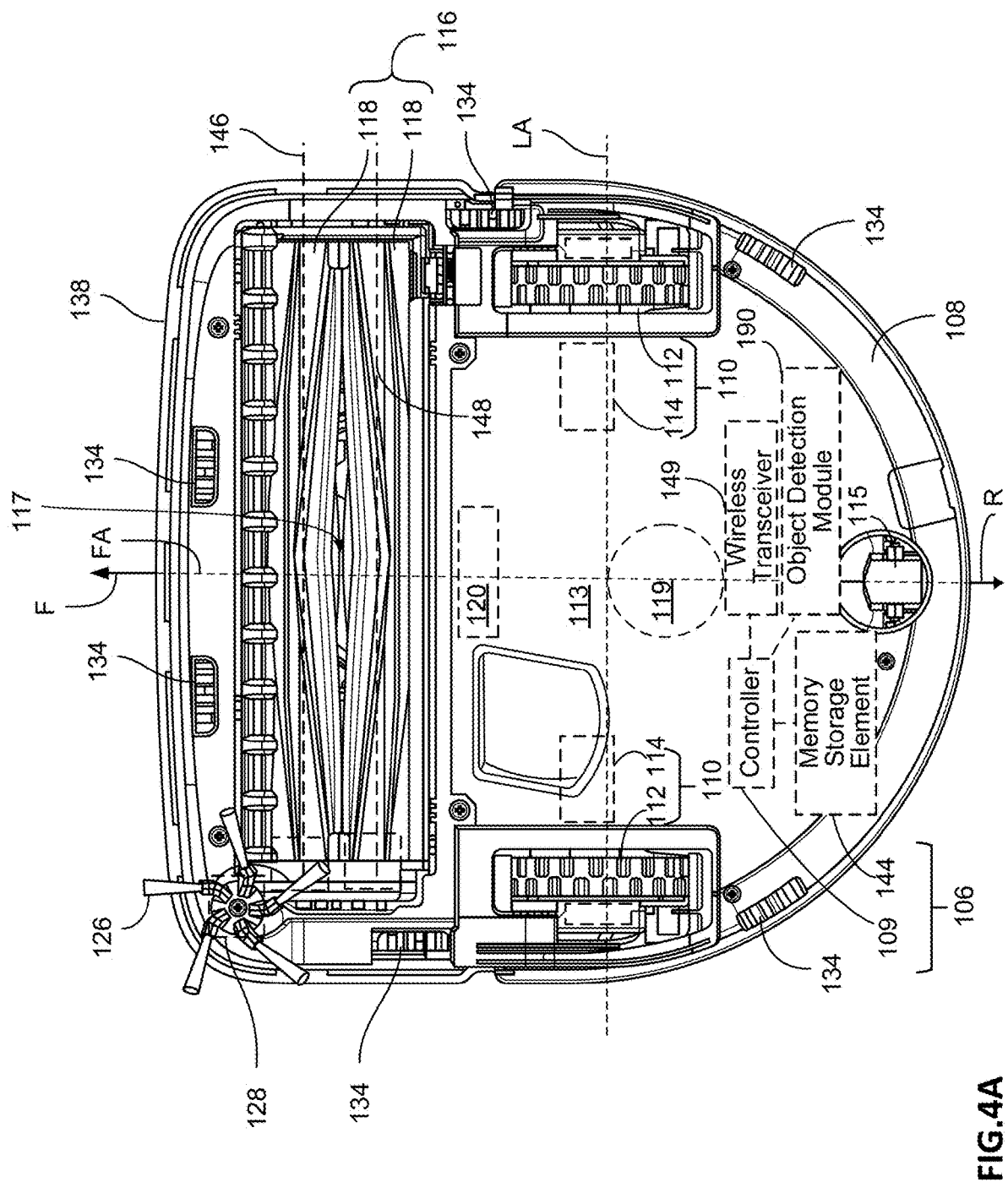
FIG. 4A is a bottom view of an autonomous cleaning robot.
Figure 4B:
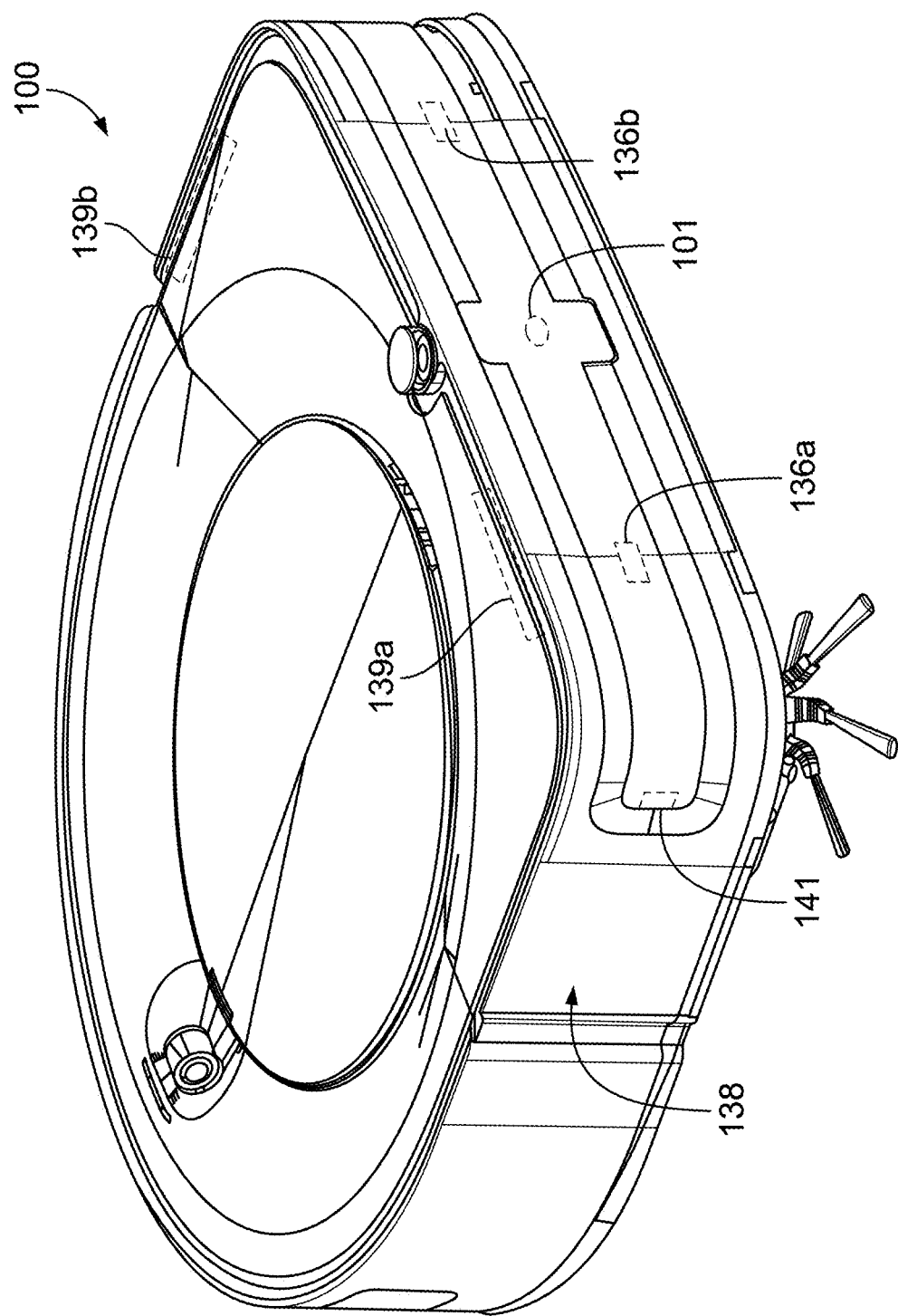
FIG. 4B is a top perspective view of the robot of FIG. 4A.

FIGS. 3 and 4A-4B depict an example of the robot 100. Referring to FIG. 3, the robot 100 collects debris 105 from the floor surface 10 as the robot 100 traverses the floor surface 10. The robot 100 is usable to perform one or more cleaning missions in the environment 20 (shown in FIGS. 1A-1B) to clean the floor surface 10. A user can provide a command to the robot 100 to initiate a cleaning mission. For example, the user can provide a start command that causes the robot 100 to initiate the cleaning mission upon receiving the start command. In another example, the user can provide a schedule that causes the robot 100 to initiate a cleaning mission at a scheduled time.

Referring to FIG. 4A, the robot 100 includes a housing infrastructure 108. The housing infrastructure 108 can define the structural periphery of the robot 100. In some examples, the housing infrastructure 108 includes a chassis, cover, bottom plate, and bumper assembly.

The robot 100 includes a drive system 110 including one or more drive wheels. The drive system 110 further includes one or more electric motors including electrically driven portions forming part of the electrical circuitry 106. The housing infrastructure 108 supports the electrical circuitry 106, including at least a controller 109, within the robot 100.

The drive system 110 is operable to propel the robot 100 across the floor surface 10. The robot 100 can be propelled in a forward drive direction F or a rearward drive direction R. The robot 100 can also be propelled such that the robot 100 turns in place or turns while moving in the forward drive direction F or the rearward drive direction R. In the example depicted in FIG. 4A, the robot 100 includes drive wheels 112 extending through a bottom portion 113 of the housing infrastructure 108. The drive wheels 112 are rotated by motors 114 to cause movement of the robot 100 along the floor surface 10. The robot 100 further includes a passive caster wheel 115 extending through the bottom portion 113 of the housing infrastructure 108. The caster wheel 115 is not powered. Together, the drive wheels 112 and the caster wheel 115 cooperate to support the housing infrastructure 108 above the floor surface 10. For example, the caster wheel 115 is disposed along a rearward portion of the housing infrastructure 108, and the drive wheels 112 are disposed forward of the caster wheel 115.

In the example depicted in FIGS. 3, 4A, and 4B, the robot 100 is an autonomous mobile floor cleaning robot that includes a cleaning assembly 116 (shown in FIG. 4A) operable to clean the floor surface 10. For example, the robot 100 is a vacuum cleaning robot in which the cleaning assembly 116 is operable to clean the floor surface 10 by ingesting debris 105 (shown in FIG. 3) from the floor surface 10. The cleaning assembly 116 includes a cleaning inlet 117 through which debris is collected by the robot 100. The cleaning assembly 116 includes one or more rotatable members driven by a drive system (e.g., rotatable members 118 driven by a motor 120), and the cleaning inlet 117 is positioned between the rotatable members.

The rotatable members 118 are on a bottom portion of the robot 100, and are configured to rotate to direct debris into an interior of the robot 100, e.g., into a debris bin 124 (shown in FIG. 3). As shown in FIG. 3, the rotatable members 118 are rollers that counter-rotate relative to one another. For example, the rotatable members 118 can be rotatable about parallel horizontal axes 146, 148 (shown in FIG. 4A) to agitate debris 105 on the floor surface 10 and direct the debris 105 toward the cleaning inlet 117, into the cleaning inlet 117, and into a suction pathway 145 (shown in FIG. 3) in the robot 100.

The robot 100 further includes a vacuum system 119 operable to generate an airflow through the cleaning inlet 117 between the rotatable members 118 and into the debris bin 124. The vacuum system 119 includes an impeller and a motor to rotate the impeller to generate the airflow. The vacuum system 119 cooperates with the cleaning assembly 116 to draw debris 105 from the floor surface 10 into the debris bin 124. In some cases, the airflow generated by the vacuum system 119 creates sufficient force to draw debris 105 on the floor surface 10 upward through the gap between the rotatable members 118 into the debris bin 124. In some cases, the rotatable members 118 contact the floor surface 10 to agitate the debris 105 on the floor surface 10, thereby allowing the debris 105 to be more easily ingested by the airflow generated by the vacuum system 119.

The robot 100 further includes a brush 126 that rotates about a non-horizontal axis, e.g., an axis forming an angle between 75 degrees and 90 degrees with the floor surface 10. The robot 100 includes a motor 128 operably connected to the brush 126 to rotate the brush 126. The brush 126 is rotatable about the non-horizontal axis in a manner that brushes debris on the floor surface 10 into a cleaning path of the cleaning assembly 116 as the robot 100 moves. The brush 126 is a side brush laterally offset from a fore-aft axis FA of the robot 100 and forwardly offset from a lateral axis LA of the robot 100 such that the brush 126 extends beyond an outer perimeter of the housing infrastructure 108 of the robot 100. The brush 126 can thereby be capable of engaging debris on portions of the floor surface 10 that the rotatable members 118 typically cannot reach, e.g., portions of the floor surface 10 outside of a portion of the floor surface 10 directly underneath the robot 100.

The electrical circuitry 106 includes, in addition to the controller 109, a memory storage element 144 and a sensor system with one or more electrical sensors, for example. The sensor system, as described herein, can generate a signal corresponding to a current location of the robot 100, and can generate signals corresponding to locations of the robot 100 as the robot 100 travels along the floor surface 10. The controller 109 is configured to execute instructions to perform one or more operations as described herein. The memory storage element 144 is accessible by the controller 109 and disposed within the housing infrastructure 108.

The one or more electrical sensors can be configured to detect features in an environment 20 of the robot 100. For example, referring to FIG. 4A, the sensor system includes cliff sensors 134 that can detect obstacles such as drop-offs and cliffs below portions of the robot 100 where the cliff sensors 134 are disposed and redirect the robot accordingly. Referring to FIG. 4B, the sensor system further includes one or more proximity sensors (e.g., proximity sensors 136a, 136b) that can detect the presence or absence of objects along the floor surface 10 that are near the robot 100. The sensor system further includes a bumper system including the bumper 138 and one or more bump sensors (e.g., bump sensors 139a, 139b) that detect contact between the bumper 138 and obstacles in the environment 20. The sensor system further includes one or more obstacle following sensors (e.g., obstacle following sensor 141) that can detect the presence or the absence of an object adjacent to a side surface of the housing infrastructure 108. For example, the detectable objects can include obstacles such as furniture, walls, persons, and other objects in the environment 20 of the robot 100.

The sensor system can further include the image capture device 101 (shown in FIG. 4B). The image capture device 101 is positioned on a forward portion of the robot 100 and is directed to capture imagery of at least a portion of the floor surface 10 forward of the robot 100. In particular, the image capture device 101 can be directed in a forward direction F (shown in FIG. 4A) of the robot 100. The image capture device 101 can be, for example, a camera or an optical sensor. Referring to FIG. 2, the field of view 103 of the image capture device 101 extends laterally and vertically. The imagery can represent portions of the floor surface 10 as well as other portions of the environment 20 above the floor surface 10. For example, the imagery can represent portions of wall surfaces and obstacles in the environment 20 above the floor surface 10. As described herein, the image capture device 101 can generate imagery for producing representations of maps of the environment 20 and for controlling navigation of the robot 100 about obstacles.

The image capture device 101 can also be an obstacle detection sensor, wherein images captured by the image capture device 101 are used as input to an object detection module 190 (shown in FIG. 4A) for detecting obstacles including clothing, electrical cords, backpacks, etc. (e.g., using image analysis techniques). In some implementations, the object detection module 190 can further receive, as input, data from other sensors of the robot 100 e.g., the cliff sensors 134, the proximity sensors 136a, 136b, the bump sensors 139a, 139b, the obstacle following sensor 141, etc., in order to detect obstacles in the environment 20.

The sensor system can further include additional obstacle detection sensors. For example, active detection technology (e.g., LIDAR, RADAR, Ultrasonic, etc.), passive detection technology, etc. can be employed instead of or in combination with the image capture device 101 to detect potential obstacles in the environment 20 and determine a distance of the potential obstacles from the robot 100. In some implementations, the robot 100 may include a light that is used with the image capture device 101 for determining the distance of an object from the robot 100 (e.g., based on shadows, reflectivity, etc.).

The sensor system can further include one or more sensors for detecting an error condition of the robot. For example, one or more electrical current sensors can provide sensor data about the electrical current provided to various components of the robot 100 including the drive wheels 112, the cleaning assembly 116, or the brush 126. This sensor data can be used to detect if the robot 100 is stuck or if the cleaning assembly 116 is jammed. In some cases, the sensor data can be used to identify a component of the robot 100 (e.g., a drive wheel 112 or a brush 126) for replacement.

The sensor system can further include sensors for tracking a distance traveled by the robot 100 (e.g., motor encoders, optical sensors, etc.). The controller 109 uses data collected by the sensors of the sensor system to control navigational behaviors of the robot 100 during the mission. For example, the sensor data can be used by the controller 109 for simultaneous localization and mapping (SLAM) techniques in which the controller 109 extracts features of the environment 20 represented by the sensor data and constructs a map of the floor surface 10 of the environment 20. The map formed from the sensor data can denote locations of traversable and non-traversable space within the environment 20. For example, locations of obstacles are denoted on the map as non-traversable space, and locations of open floor space are denoted on the map as traversable space.

The sensor data collected by any of the sensors can be stored in the memory storage element 144. In addition, other data generated for the SLAM techniques, including mapping data, can be stored in the memory storage element 144. These data produced during the mission can include persistent data that are produced during the mission and that are usable during a further mission. For example, the mission can be a first mission, and the further mission can be a second mission occurring after the first mission. In addition to storing the software for causing the robot 100 to perform its behaviors, the memory storage element 144 stores sensor data or data resulting from processing of the sensor data for access by the controller 109 from one mission to another mission. For example, the map is a persistent map that is usable and updateable by the controller 109 of the robot 100 from one mission to another mission to navigate the robot 100 about the floor surface 10.

The persistent data, including the persistent map, enable the robot 100 to efficiently clean the floor surface 10. For example, the persistent map enables the controller 109 to direct the robot 100 toward open floor space and to avoid non-traversable space. In addition, for subsequent missions, the controller 109 is able to plan navigation of the robot 100 through the environment 20 using the persistent map to optimize paths taken during the missions.

The robot 100 can further include a wireless transceiver 149 (shown in FIG. 4A). The wireless transceiver 149 allows the robot 100 to wirelessly communicate data with a communication network. The robot 100 can receive or transmit data using the wireless transceiver 149, and can, for example, receive data representative of a map and transmit data representative of mapping data collected by the robot 100.

When the controller 109 causes the robot 100 to perform the mission, the controller 109 operates the motors 114 to drive the drive wheels 112 and propel the robot 100 along the floor surface 10. In addition, the controller 109 operates the motor 120 to cause the rotatable members 118 to rotate, operates the motor 128 to cause the brush 126 to rotate, and operates the motor of the vacuum system 119 to generate the airflow. To cause the robot 100 to perform various navigational and cleaning behaviors, the controller 109 executes software stored on the memory storage element 144. Execution of the software operates the various motors of the robot 100 to cause the robot 100 to perform the behaviors.

Example Processes

Figure 5:
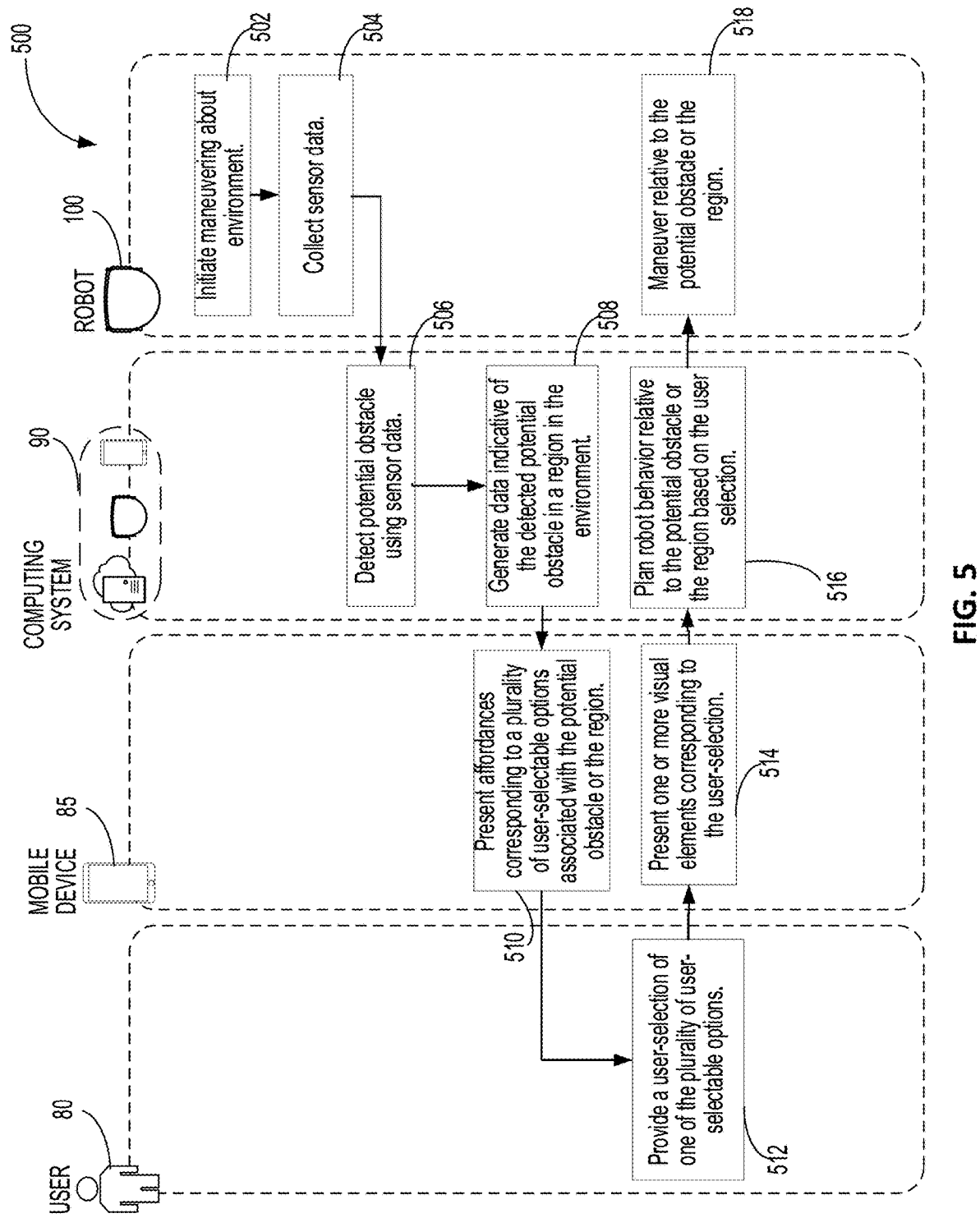
FIG. 5 is a flowchart of a process of providing user feedback on obstacles detected by an autonomous mobile robot.

FIG. 5 illustrates a flowchart of an example process 500 of providing user feedback on obstacles detected by the autonomous mobile robot 100. The process 500 includes operations 502, 504, 506, 508, 510, 512, 514, 516, 518.

The operations 502 and 504 involve operations of the robot 100 as the robot 100 maneuvers about the environment (e.g., environment 20 shown in FIGS. 1A-1B). At the operation 502, the robot 100 initiates maneuvering about the environment. For example, the robot 100 can initiate maneuvering about the environment in response to receiving a command to begin a cleaning mission. At the operation 504, the robot 100 collects sensor data. The sensor data can be collected by a sensor system of the robot 100 and can be used for various purposes including generate mapping data of the environment and detecting potential obstacles as the robot 100 maneuvers about the environment. As the robot 100 maneuvers about the environment, the robot 100 can clean the floor surface if the operations 502 and 504 occur as part of a cleaning mission. In some cases, the robot 100 can move about the floor surface without cleaning.

The operations 506, 508, 510 involve operations to present a user 80 with a plurality of user-selectable options associated with potential obstacles or locations of the potential obstacles in the environment. In some implementations, each user-selectable option can be presented as an affordance (e.g., a button, an interactive visual element, etc.) corresponding to the option. The operations 506 and 508 are performed by a computing system 90, which can be a controller located on the robot 100, a controller located on a mobile computing device 85, a remote computing system, a distributive computing system that includes processors located on multiple devices (e.g., the robot 100, the mobile device 85, or a remote computing system), processors on autonomous mobile robots in addition to the robot 100, or a combination of these computing devices. In some cases, one or more operations performed by the computing system 90 (e.g. operations 506, 508, 516) can be performed by different actors. For example, detection of a potential obstacle using sensor data (operation 506) could be performed on a remote server, while planning robot behavior relative to the potential obstacle (operation 516) can be performed onboard the robot 100.

At the operation 506, the sensor data is used for detecting a potential obstacle in the environment. For example, images captured by the image capture device 101 of the robot 100 can be analyzed using an object detection module 190 (e.g., that employs executable instructions of an object detection algorithm) to detect potential obstacles in the vicinity of the robot 100. At the operation 508, the computing system 90 generates data indicative of the detected potential obstacle in a region in the environment. For example, the data can include a portion of the imagery captured by the image capture device 101 (e.g., a single image taken at the location of the robot 100 when the robot 100 detects the potential obstacle, a series of images, etc.), a location of the obstacle or region, and/or a label denoting a classification of the potential obstacle (e.g., a sock, a cord, a backpack, etc.). At operation 510, the mobile computing device 85 presents affordances corresponding to a plurality of user-selectable options associated with the potential obstacle or the region to the user 80.

The user-selectable options allow the user 80 to provide user feedback to the robot 100 on the potential obstacle, and can cause the robot 100 to maneuver relative to the potential obstacle or the region in particular ways. The user-selectable options can modify various cleaning parameters of the robot 100. For example, some user-selectable options can cause the robot 100 to perform certain actions such as cleaning a region, avoiding a region, adjusting a cleaning power of the robot in a region, etc. Some user-selectable options can modify the missions during which the robot 100 performs certain actions (e.g., an immediately subsequent mission; all subsequent missions; a specified number of subsequent missions; all subsequent missions within a day, week, month, etc.). Some user-selectable options can cause the robot 100 to include or exclude a region in a tidy-up mission, some options can modify the scheduling of a tidy-up mission (e.g., now, 30 minutes from now, 1 hour from now, 6 hours from now, 12 hours from now, etc.), and some options can modify the length of a tidy-up mission (e.g., a maximum length of 5 minutes, 15 minutes, 30 minutes, 1 hour, etc.).

In some implementations, the user-selectable options can include a first option to maneuver the robot 100 to clean the region and a second option to maneuver the robot 100 to avoid the region. In some cases, multiple options can be presented to cause the robot to clean the region or avoid the region. For example, a first option can cause the robot to avoid the region only during a second cleaning mission while a second option can cause the robot to avoid the region during a second cleaning mission and in one or more cleaning missions subsequent to the second cleaning mission. The plurality of user-selectable options can also include an option to specify an absence of an obstacle in the region (e.g., if the potential obstacle detected by the robot 100 is not actually an obstacle or does not exist). In some cases, the option to specify the absence of an obstacle in the region can also cause the robot 100 to clean the region. In some cases, the option to specify the absence of an obstacle in the region can cause the robot 100 to update the object detection module 190 (e.g., a module employing a convolutional neural network) implemented by the computing system 90 in order to reduce the likelihood of false detection of potential obstacles in subsequent cleaning missions.

At the operation 512, the user 80 provides a user-selection of one of the plurality of user-selectable options. For example, based on reviewing information about the potential obstacle (e.g., one or more images of the potential obstacle, a location of the potential obstacle, a label denoting a classification of the potential obstacle, etc.), the user 80 can select one of the user-selectable options (e.g., by interacting with a corresponding affordance) to provide feedback on the potential obstacle to the robot 100. In some cases, the information about the potential obstacle is displayed on the mobile device 85 along with the user-selectable options. At the operation 514, the mobile device 85 can present one or more visual elements corresponding to the user-selection on a display. For example, the selected option may be shaded, outlined, changed in size, etc. to show that it has been selected.

At the operation 516, the computing system 90 plans a behavior of the robot 100 relative to the potential obstacle or the region based on the user selection. As described previously, this planned behavior can include cleaning the region or avoiding the region. Planning the behavior of the robot 100 relative to the potential obstacle can also include planning a path or trajectory of the robot to and from the region. In cases where multiple potential obstacles are detected, the planned behavior of the robot 100 can include planning a path or trajectory of the robot 100 between multiple regions associated with the multiple potential obstacles. At operation 518, the robot 100 maneuvers relative to the obstacle or the region (e.g., in accordance with the planned robot behavior).

In some implementations, multiple potential obstacles can be detected in the environment, and process 500 can be performed multiple times (e.g., once for each potential obstacle). In some cases, the user can provide feedback in real-time, providing feedback on each potential obstacle as it is detected during a mission. In other cases, the user can review multiple potential obstacles at once (e.g., after completion of a first mission), and the user-selection for each potential obstacle can be used to plan behaviors of the robot relative to the potential obstacles or regions during a second mission (e.g., a tidy-up mission).

Figure 6:
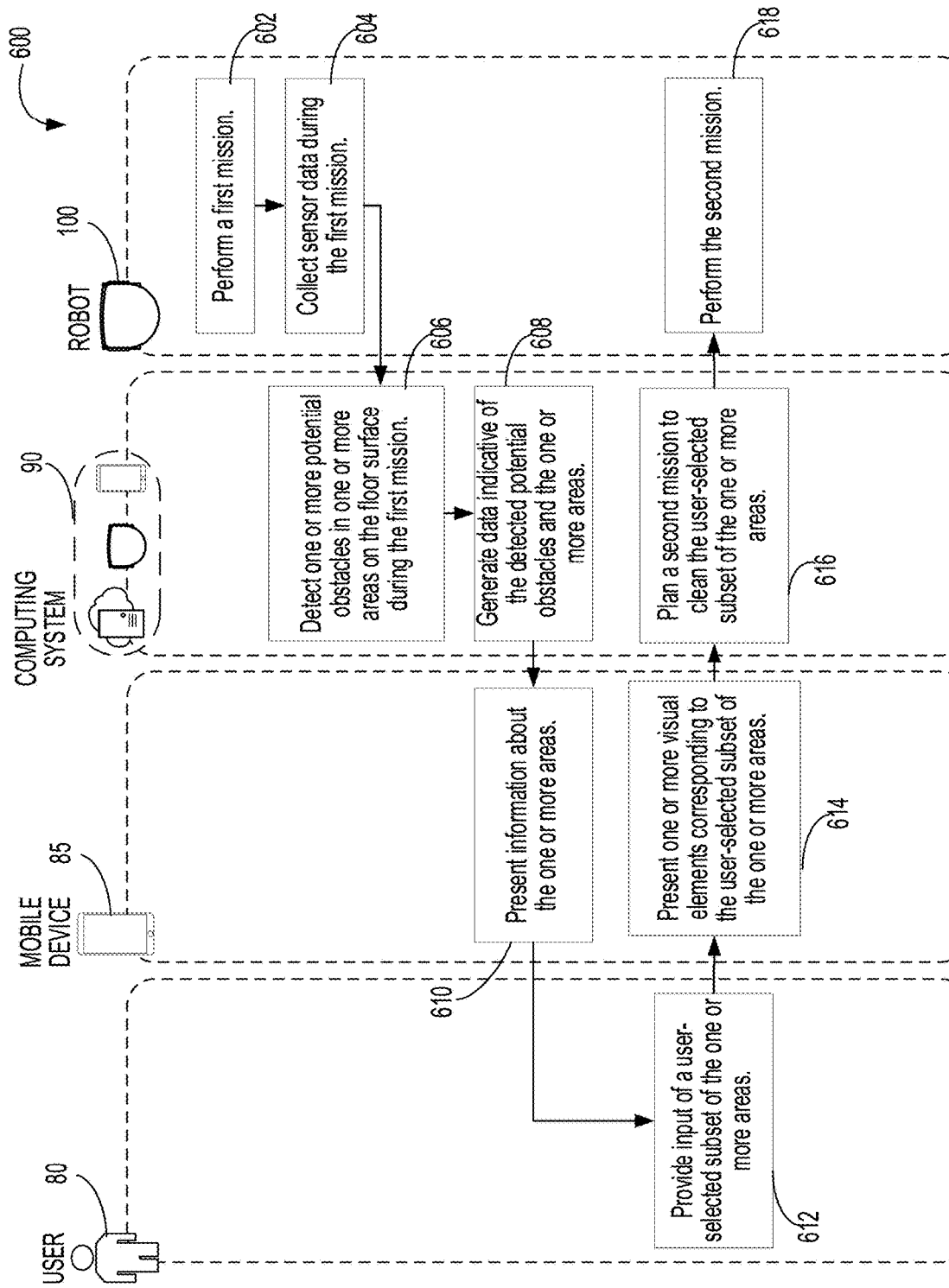
FIG. 6 is a flowchart of a process of planning a tidy-up mission.

FIG. 6 illustrates a flowchart of a process 600 of planning a tidy-up mission. The operations 602 and 604 involve operations of the robot 100 as the robot 100 maneuvers about the environment (e.g., environment 20 shown in FIGS. 1A-1B). At the operation 602, the robot 100 performs a first mission (e.g., a cleaning mission or training mission). At the operation 604, the robot 100 collects sensor data during the first mission. The sensor data can be collected by a sensor system of the robot 100 and can be used for various purposes including generating mapping data of the environment and detecting potential obstacles as the robot 100 maneuvers about the environment. As the robot 100 maneuvers about the environment, the robot 100 can clean the floor surface. In some cases, the robot 100 can move about the floor surface without cleaning.

The operations 606, 608, 610 involve operations to generate information about one or more areas in the environment in which potential obstacles are detected, and to present the information to a user 80. The operations 606 and 608 are performed by the computing system 90, which can be a controller located on the robot 100, a controller located on a mobile computing device 85, a remote computing system, a distributive computing system that includes processors located on multiple devices (e.g., the robot 100, the mobile device 85, or a remote computing system), processors on autonomous mobile robots in addition to the robot 100, or a combination of these computing devices. In some cases, one or more operations performed by the computing system 90 (e.g. operations 606, 608, 616) can be performed by different actors. For example, detection of potential obstacles (operation 606) could be performed on a remote server, while planning robot behavior relative to the potential obstacle (operation 616) can be performed onboard the robot 100.

At the operation 606, the sensor data is used for detecting one or more potential obstacles in one or more areas on the floor surface (e.g., floor surface 10 shown in FIGS. 1A-1B) during the first mission. For example, images captured by the image capture device 101 of the robot 100 can be analyzed using the object detection module 190 (e.g., that employs executable instructions associated with an object detection algorithm) to detect potential obstacles in the vicinity of the robot 100. At the operation 608, the computing system 90 generates data corresponding to the detected potential obstacles and the one or more areas. For example, the data can include a portion of the imagery captured by the image capture device 101 (e.g., a single image taken at the location of the robot 100 when the robot 100 detects the potential obstacle, a series of images, a video clip, etc.), a location of the obstacle or region, and/or a label denoting a classification of the potential obstacle (e.g., a sock, a cord, a backpack, etc.). At operation 610, the mobile computing device 85 presents information about the one or more areas to a user 80 on a display. In some implementations, the presented information can include images of the potential obstacles, locations of the potential obstacles or areas, and/or labels denoting a classification of the potential obstacles. In some implementations, affordances corresponding to a plurality of user-selectable options associated with the potential obstacles (as described in relation to FIG. 5) can also be presented to the user 80.

At operation 612, the user 80 provides input of a user-selected subset of the one or more areas. For example, the subset of the one or more areas can include areas that the user 80 intends for the robot 100 to clean. As similarly described in relation to FIG. 5, in some implementations, the user selects the subset of one or more areas by interacting with an interface being presented by the mobile device 85 (e.g., options are graphically presented for selection on a display). For example, in some implementations, any of the one or more areas for which the user selects an option to cause the robot 100 to clean the area can be included in the subset.

Figure 10:
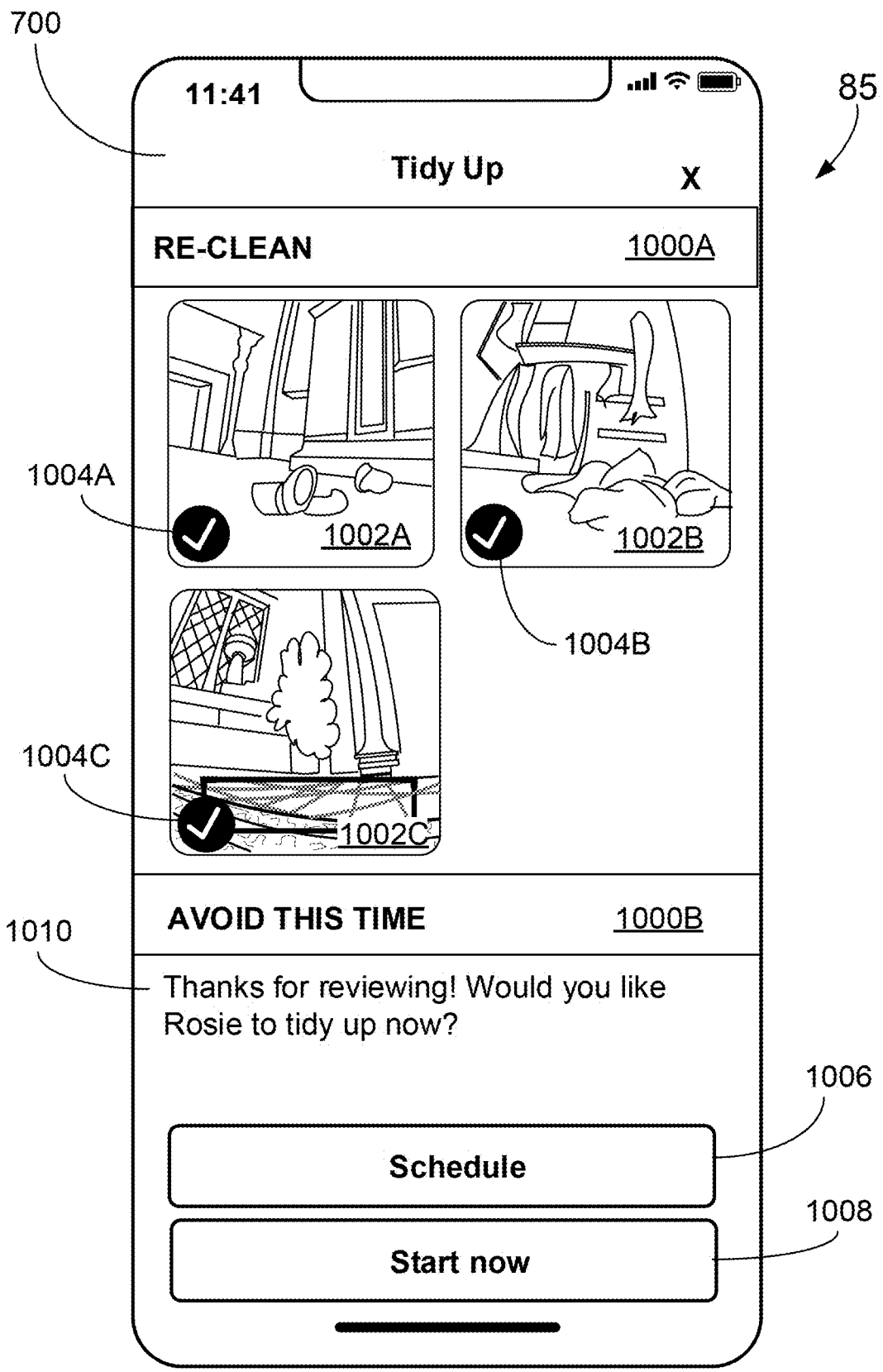
FIG. 10 is a front view of a mobile computing device presenting a user interface for initiating a tidy-up mission.

At operation 614, after receiving input from the user 80, the mobile device 85 presents one or more visual elements corresponding to the user-selected subset of the one or more areas. For example, the one or more visual elements can be presented in a user interface for initiating a tidy-up mission (an example of which is shown in FIG. 10). The one or more visual elements can include a list of the areas included in the user-selected subset, images associated with the areas included in the user-selected subset, a map representing the locations of the areas included in the user-selected subset, etc.

At operation 616, the computing system 90 plans a second mission to clean the user-selected subset of the one or more areas. Planning the second mission can include planning a path or trajectory of the robot 100 within the environment such that the robot navigates to each of the areas included in the user-selected subset. At operation 618, the robot performs the second mission.

In some implementations, the first mission and the second mission are consecutive missions. In some implementations, the second mission can be initiated within a period of time (e.g., 1 hour, 6 hours, 12 hours, 24 hours, 48 hours, etc.) after a completion of the first mission. In some implementations, during the second mission or after completion of the second mission, the robot 100 can transmit, to the mobile device 85, data corresponding to an updated status of the user-selected subset of the one or more areas. In some implementations, the mobile computing device 85 can present at least a portion of this data on a display (e.g., described in further detail in relation to FIGS. 11A-11B).

Figure 7:
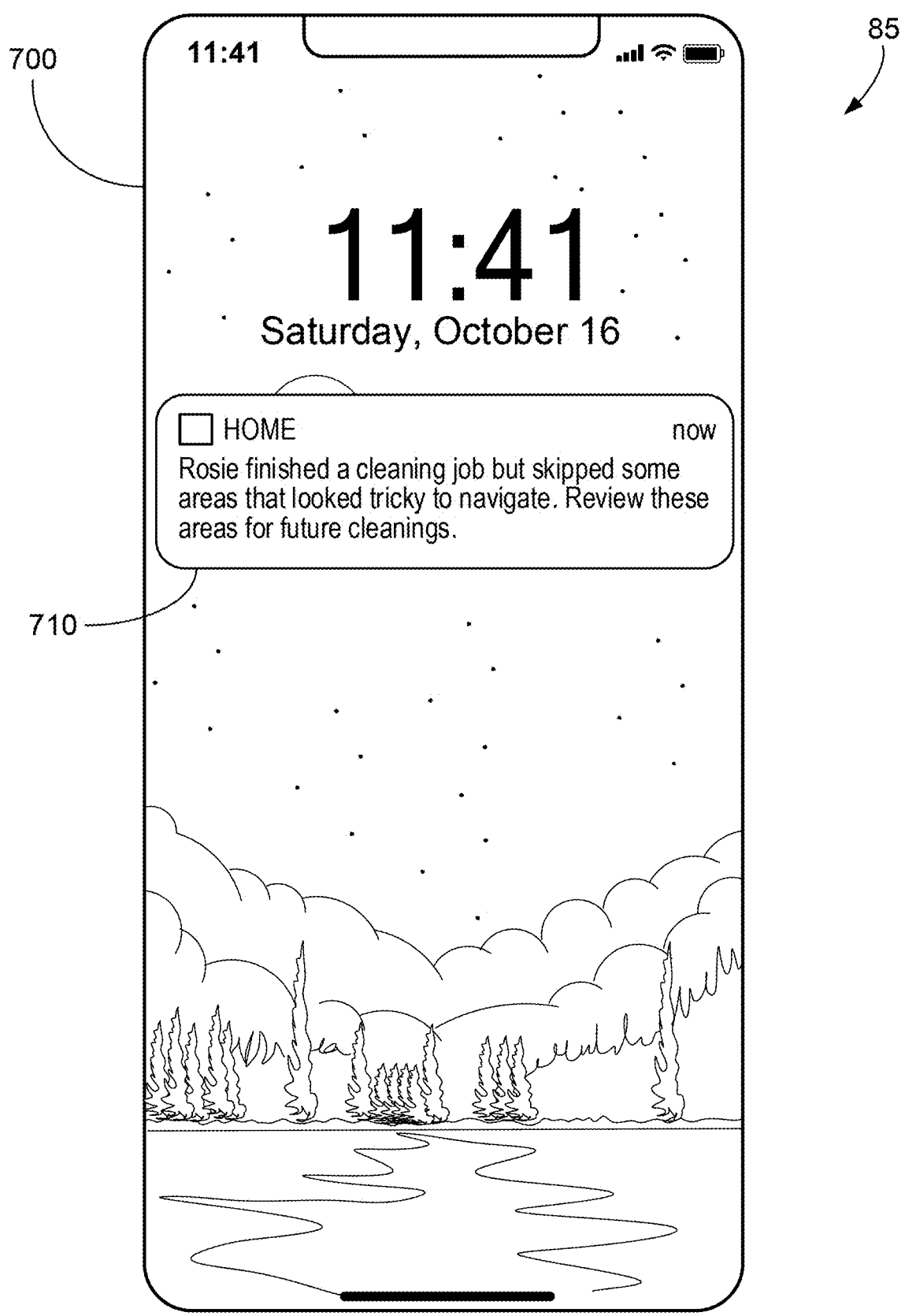
FIG. 7 is a front view of a mobile computing device presenting a notification to plan a tidy-up mission.

FIGS. 7-10 are front views of the mobile computing device 85 and illustrate an example user interface (UI) for providing user feedback on obstacles detected by the autonomous mobile robot 100 (as described in relation to FIG. 5) and planning a tidy-up mission (as described in relation to FIG. 6). Referring to FIG. 7, the mobile computing device 85 (sometimes referred to simply as a "mobile device") includes a display 700. After the robot 100 completes a cleaning mission, a push notification 710 can be sent to the mobile device 85 and presented on the display 700.

The push notification 710 can include a message stating that a cleaning mission has been completed by the robot 100 (named "Rosie" in this example), but that some areas were not cleaned during the cleaning mission. The push notification 710 can encourage the user to review these areas for future cleanings. In some implementations, reviewing the areas includes providing user feedback on the areas and potential obstacles detected by the robot 100 in those areas. In some implementations, reviewing the areas can include planning a tidy-up mission.

Figure 8A:
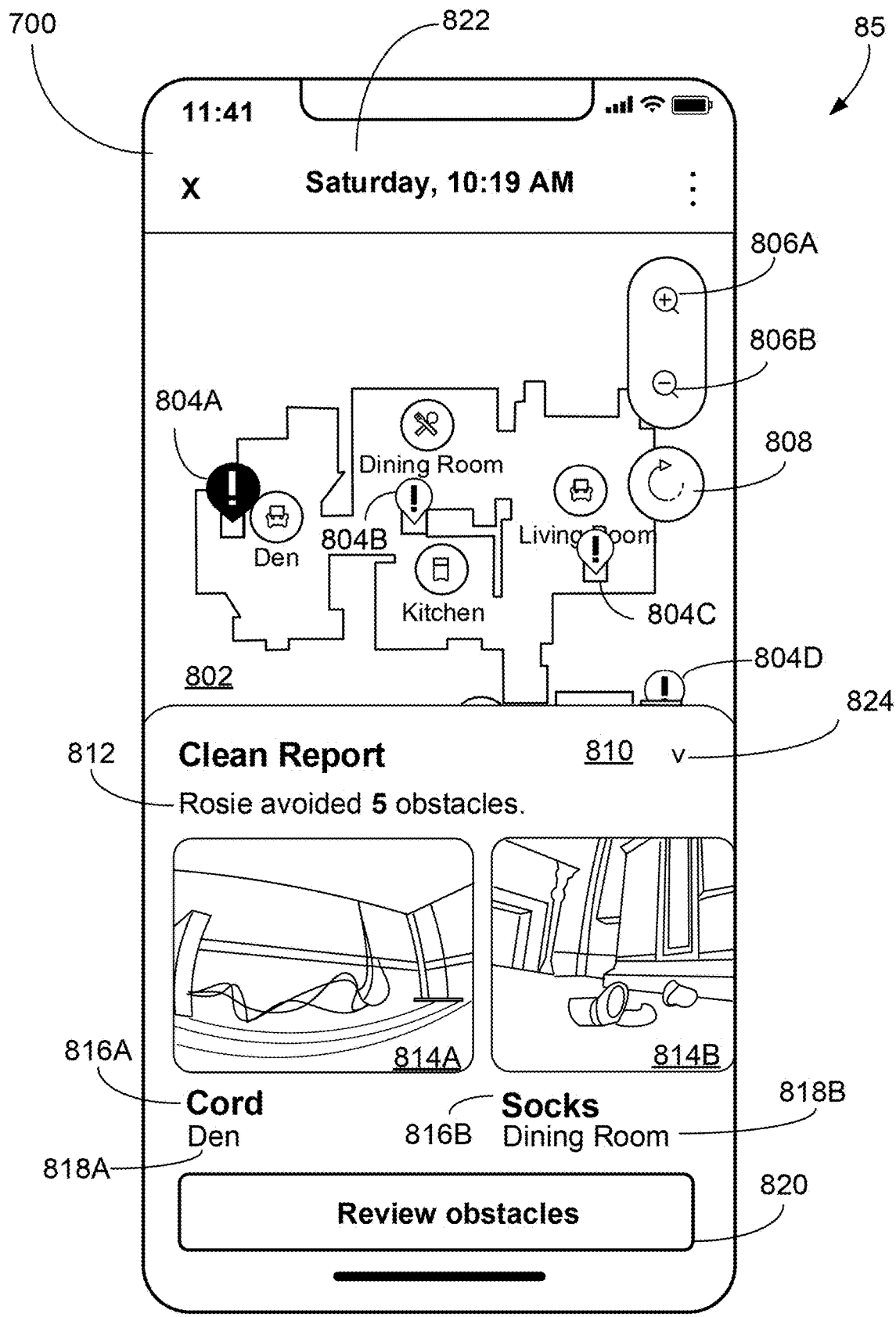
FIGS. 8A-8D are front views of a mobile computing device presenting a user interface for viewing obstacles detected by an autonomous cleaning robot.
Figure 8B:
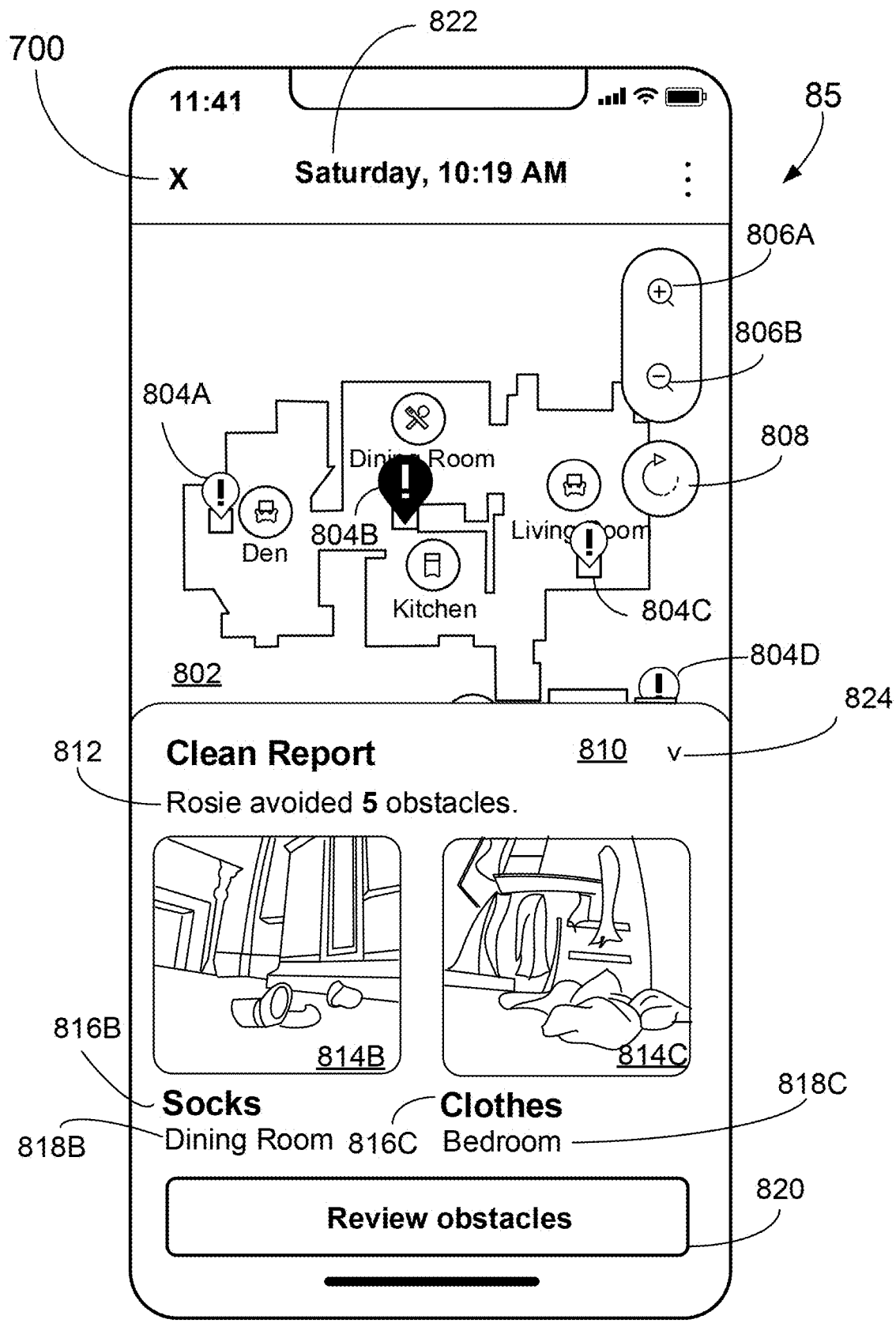

Referring to FIG. 8A, after receiving the push notification 710, the user 80 can navigate to a screen presented on the display 700 (e.g., by interacting with the push notification, by opening a mobile application, etc.) for viewing obstacles detected by the robot 100. The display 700 can include a time stamp 822 that includes a day and time when the cleaning mission was started or when the cleaning mission was completed. The display 700 can also include a map 802 of an environment in which the robot 100 performed the cleaning mission. In this example, the environment is a home including a den, a dining room, a kitchen, a living room, and a bedroom (not shown). The display 700 also includes control options to interact with the map 802 including a zoom-in option 806A, a zoom-out option 806B, and a rotate map option 808 that rotates the map (e.g., by 90 degrees in a clockwise direction). Indicators 804A, 804B, 804C, 804D (jointly referred to as indicators 804) are presented on the map 802, showing the location of potential obstacles detected by the robot 100 during the cleaning mission. In FIG. 8A, the indicator 804A is selected, as depicted by a change in color and enlarged size. While the indicators 804 are shown as exclamation points, this is not intended to be limiting, and other symbols can be used. For example, in some implementations, the indicators 804 may include symbols corresponding to a type of the potential obstacle (e.g., a sock, a shoe, a cord, etc.).

The display 700 also includes a clean report 810, which presents additional information about the one or more potential obstacles detected by the robot 100. The clean report 810 can include a summary statement 812 which provides information about a total number of potential obstacles detected in the environment during the cleaning mission (e.g., 5 obstacles in this example). For each potential obstacle, the clean report 810 can include an image of the potential obstacle (e.g., images 814A, 814B), a label denoting a classification of the potential obstacle (e.g., labels 816A, 816B), and an area where the potential obstacle was detected (e.g., areas 818A, 818B). Referring now to FIG. 8D, in some implementations, the clean report 810 can be a textual report. The clean report 810 can include a title 830 for the mission, which can specify an environment 20 the robot 100 is in (e.g., "Main Floor") or a type of mission performed by the robot 100 (e.g., "Cleaning Mission", "Training Mission", etc.). In some cases, the title 830 can be edited and customized by the user 80. The clean report 810 can also include various entries (e.g., entry 832, entry 840) that are listed in chronological order to create a timeline of the mission. Entry 832 is an example of an entry for a particular area in the environment (e.g., environment 20), and includes a status indicator 834, a name of the area 836, and a time spent 838 in the area. In this example, entry 832 shows that a kitchen was successfully cleaned for 24 minutes. Entry 840 is an example of an entry for a potential obstacle detected in the environment, and includes a status indicator 842 (which may be different from the status indicator 834), a message 844, and a time that the potential obstacle was encountered 846. In some implementations, the message 844 can state that a potential obstacle was detected, and in some implementations, the message 844 can include information about the obstacle such as a classification and a location of the potential obstacle (e.g., "Socks in Dining Room"). In this example, entry 840 shows that socks were detected in the dining room at 9:42 AM. In some implementations, the entry 840 can include a user-selectable affordance 890 that, when selected, can cause the robot 100 to clean an area associated with the location of the potential obstacle during a subsequent mission (e.g., a tidy-up mission). In some implementations imagery associated with the potential obstacle can be included in the clean report 810 (e.g., as part of the entry 840, next to the entry 840, at the bottom of the clean report 810, etc.). In some implementations, the entry 840 can be selected by the user 80 (e.g., by touching the entry 840, touching and holding the entry 840, hovering a cursor over the entry 840, etc.) in order to view further information about the potential obstacle including imagery associated with the potential obstacle and/or a map representing the location of the potential obstacle within the environment. In some implementations, the clean report 810 can further include a summary entry 895 that can include, for example, a date of the mission, a time of the mission, and/or a time spent to complete the mission. In some implementations, only a portion of the information described may be presented within the clean report 810, and in some implementations additional information can be presented.

In some implementations, the clean report 810 can be displayed prior to the user 80 reviewing further information about each potential obstacle (described in further detail with respect to FIGS. 9A-9D). In an example of such implementations, if the user selects affordance 890 from the clean report 810, no further review of the potential obstacle may be required in order to initiate a subsequent mission (e.g., a tidy-up mission). In another example, selection of affordance 890 can cause the robot to immediately return to the area associated with a potential obstacle without requiring feedback about other potential obstacles. In some implementations, the clean report 810 can be displayed in real-time as a mission is being performed, and selection of affordance 890 can cause the robot 100 to return to the area associated with a potential obstacle during the same mission.

In some implementations, the clean report 810 can be displayed after the user 80 has already reviewed further information about each potential obstacle and provided feedback about the potential obstacles. In such cases, a user-selection of affordance 890 from the clean report 810 can adjust or override previously provided feedback about a potential obstacle. For example, subsequent to user review of the potential obstacles, the clean report 810 can serve as a user interface for planning a tidy-up mission. Examples of user interfaces for planning tidy-up missions are described in further detail herein with respect to FIG. 10.

Referring again to FIG. 8A, because indicator 804A is selected, information about a potential obstacle associated with indicator 804A is displayed in a primary position within the clean report 810. In this example, the potential obstacle associated with the indicator 804A is a cord located in the den. In some implementations, multiple potential obstacles are presented simultaneously in the clean report 810. For example, the potential obstacles can be presented in an order corresponding to the chronological order during which the robot 100 detected the potential obstacles. In this example, the next potential obstacle detected by the robot 100 was a group of socks in the dining room, as shown by image 814B, label 816B, and area 818B.

In order to view information about the remainder of the detected potential obstacles, the user 80 can select any of the indicators 804 to view the potential obstacles corresponding to those indicators. Alternatively, the user 80 can scroll (e.g., using a left-to-right or right-to-left gesture on the display 700) through each of the potential obstacles detected by the robot 100. For example, referring to FIG. 8B, in response to the user selecting indicator 804B, information about the potential obstacle associated with indicator 804B (e.g., socks in the dining room) is displayed in the primary position within the clean report 810. In this example, the next potential obstacle detected after the socks in the dining room was clothing in the bedroom, as shown by image 814C, label 816C, and area 818C. In this example, the map 802 is partially covered by the clean report 810, so that the bedroom is not visible to the user 80. In some implementations, a minimization option 824 can be selected by the user 80 to minimize the clean report 810 in order to view a larger portion of the map 802.

Figure 8C:
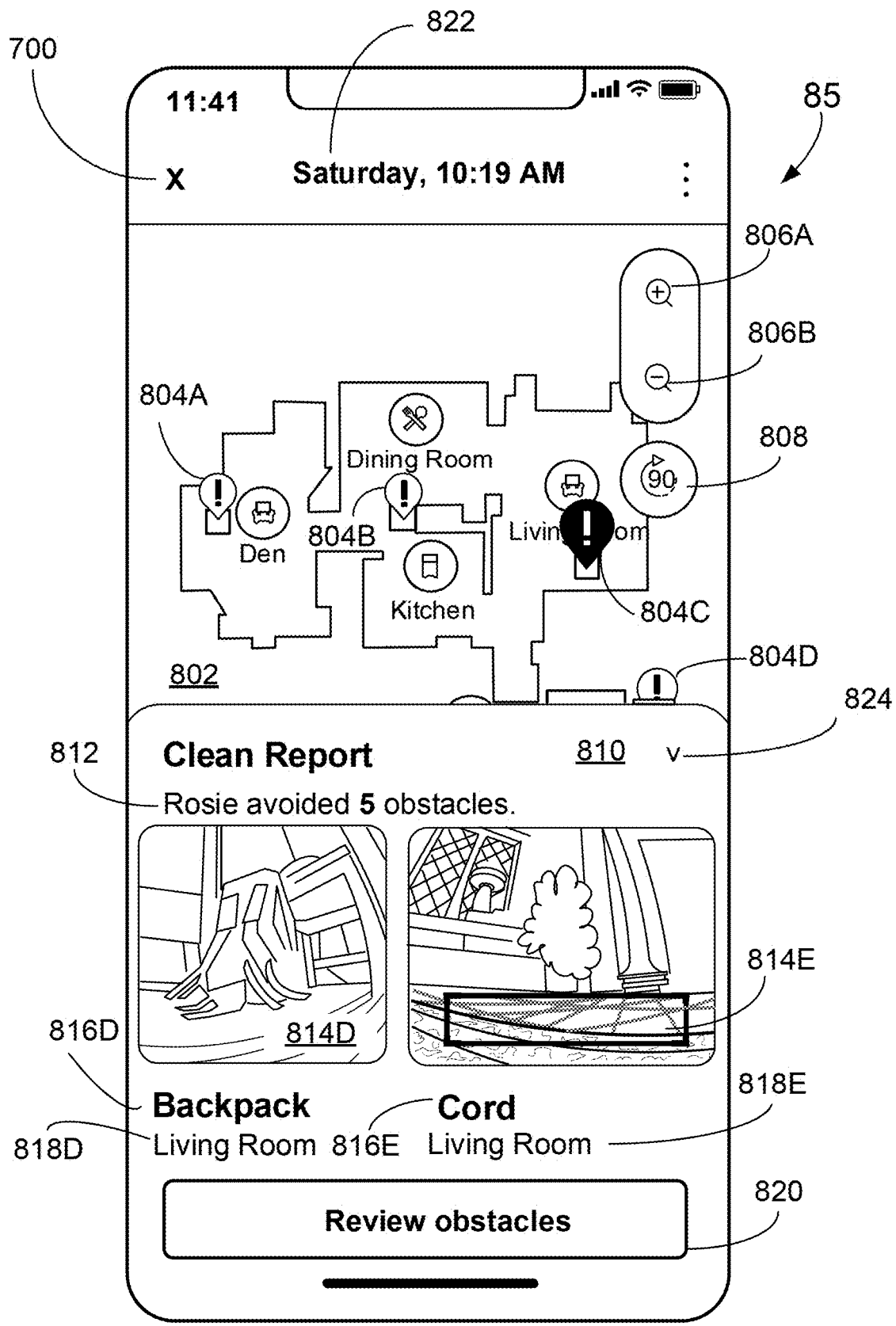
Figure 8D:
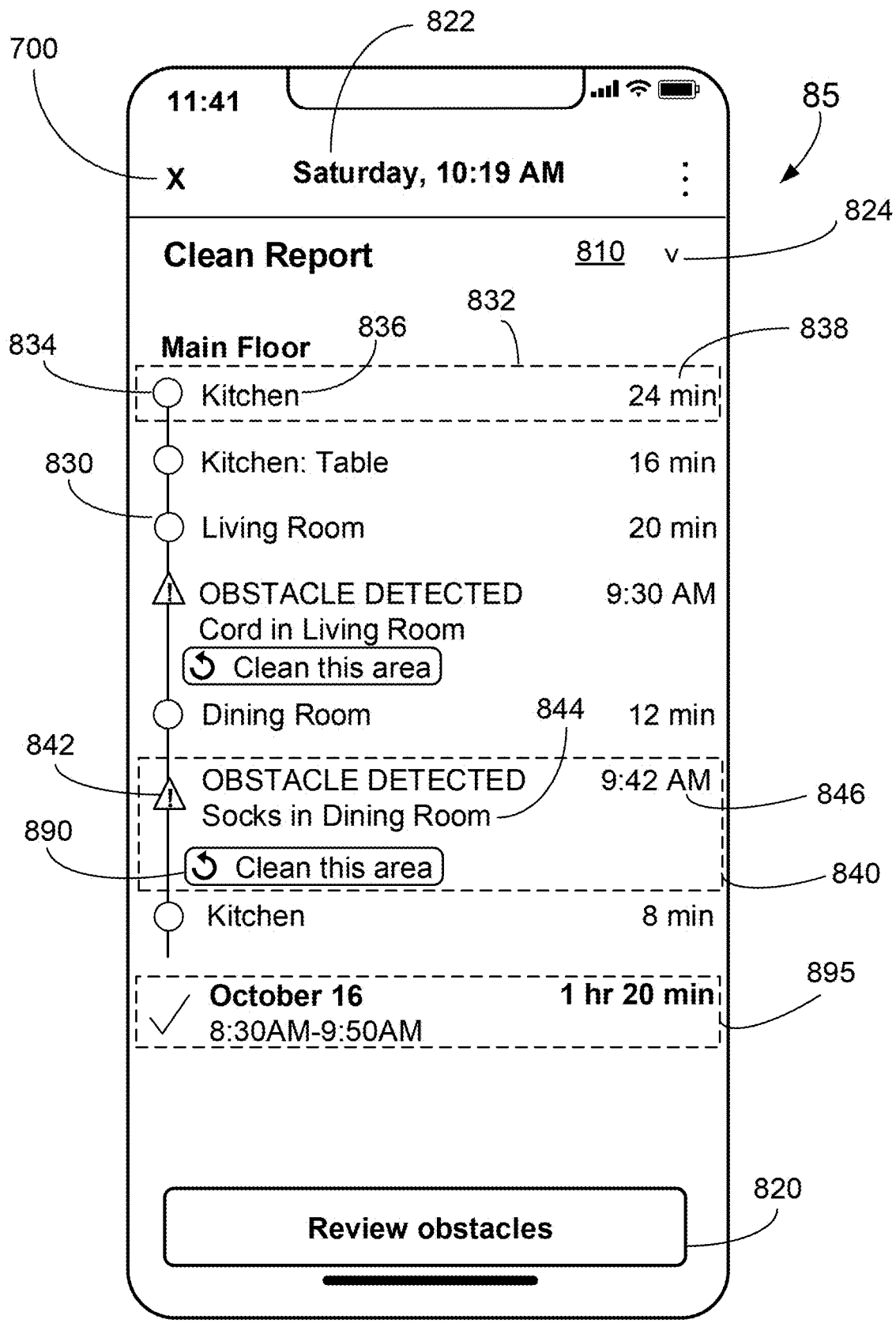

Referring now to FIG. 8C, the user can scroll through the clean report 810 to view a remainder of the potential obstacles detected by the robot 100 during the cleaning mission. In this example, the user has scrolled through the potential obstacles such that an image 814D, label 816D, and area 818D (corresponding to a backpack in the living room) are positioned in the primary position of the clean report 810. In response to the user's scrolling, the indicator 804C, corresponding to the backpack in the living room, is depicted by a change in color and enlarged size as though it had been directly selected by the user 80. In this example, the next potential obstacle detected after the backpack in the living room was a cord in the living room, as shown by image 814E, label 816E, and area 818E.

Figure 9A:
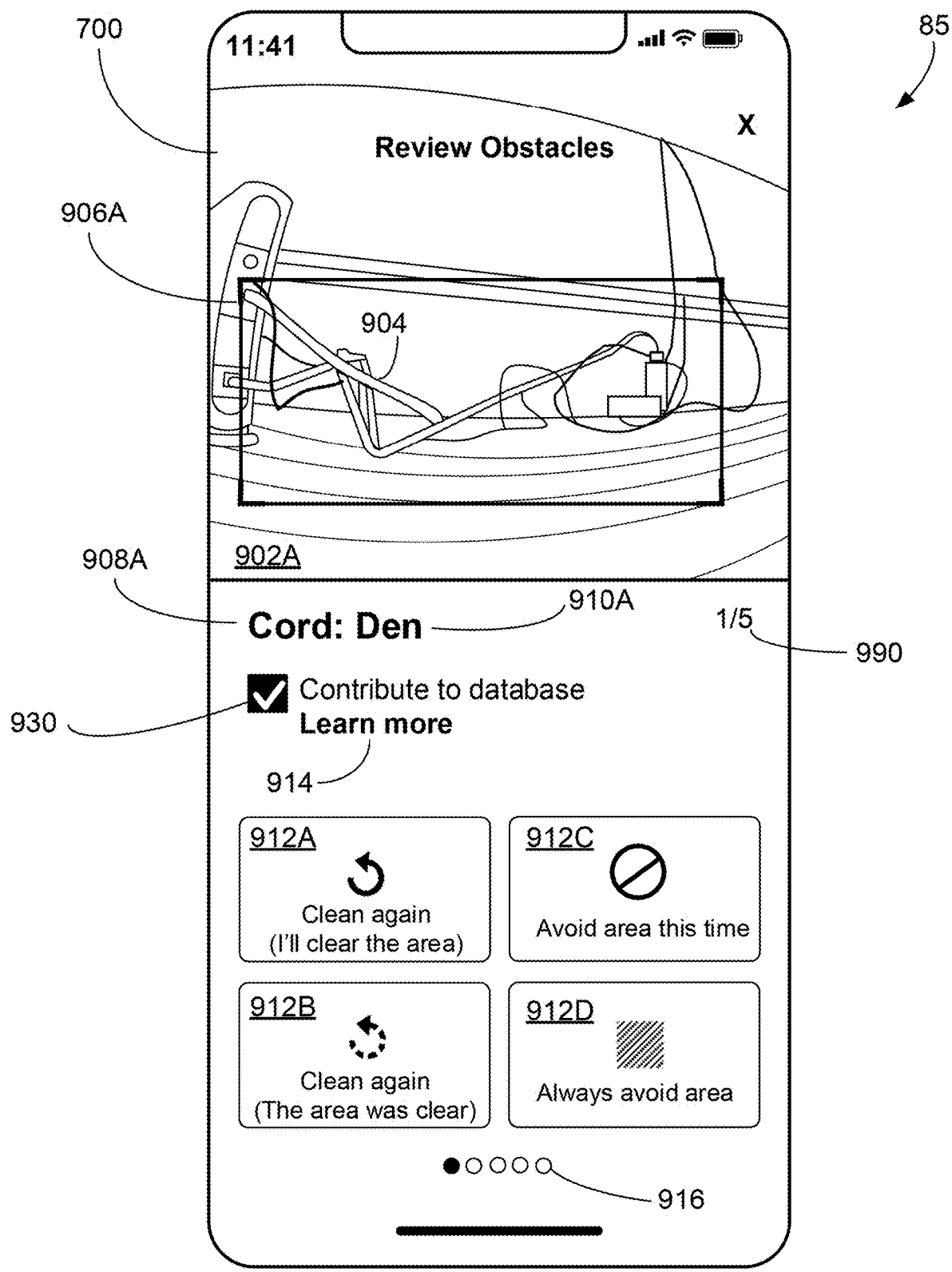
FIGS. 9A-9D are front views of a mobile computing device presenting a user interface for providing user feedback on potential obstacles detected by an autonomous cleaning robot.

At any point while viewing the potential obstacles detected by the robot 100, the user 80 can select an option 820 in order to begin providing user feedback on the potential obstacles. After selecting the option 820, the user 80 is presented with a series of screens on the display 700 to provide feedback on the potential obstacles. FIGS. 9A-9D illustrate examples of such screens. Referring to FIG. 9A, the user interface for providing user feedback on potential obstacles includes information about the potential obstacle including an image 902A of the potential obstacle, a label 908A denoting a classification of the potential obstacle (e.g., a cord 904), and an area 910A of the potential obstacle (e.g., a den). In some implementations, the image 902A may be a single image captured at a location of the robot 100 when the robot detects the potential obstacles (e.g., using image capture device 101 shown in FIG. 2). In some implementations, a series of images can be presented, wherein the series of images are captured in a vicinity of a location of the potential obstacle. In some implementations, a bounding box 906A may be presented with the image 902A in order to highlight a specific portion of the image 902A where a potential obstacle has been detected (e.g. via an object detection module 190 employing a convolutional neural network). In some implementations, an area of the image 902A that is not included inside the bounding box 906A can be darkened to further highlight the specific portion of the image 902A were the potential obstacle has been detected. In some implementations, the user interface for providing user feedback on potential obstacles can include additional information such as a confidence score or accuracy metric associated with the label 908A.

In addition to information about the potential obstacle (e.g., the cord 904), the display 700 can include a plurality of user-selectable affordances 912A, 912B, 912C, 912D (collectively referred to as user-selectable affordances 912) associated with the potential obstacle or an area in the environment where the potential obstacle was detected. In some implementations, each of the affordances 912 can correspond to a user-selectable option. For example, an affordance 912A, if selected by the user 80, can cause the robot 100 to clean the area (e.g., because the obstacle has been removed by the user 80) during an immediately subsequent mission (e.g., a tidy-up mission) and/or during another future mission (e.g., an upcoming scheduled mission). The affordance 912B can correspond to the absence of an obstacle in the area (e.g., because the user 80 has determined that the potential obstacle detected by the robot 100 is not an obstacle and/or that the area was clear). Selection of affordance 912B can cause the robot 100 to clean the area during an immediately subsequent mission and/or during another future mission, and can further cause the robot 100 to update the object detection module 190 to reduce the likelihood of false detection of potential obstacles in future cleaning missions. Affordance 912C can cause the robot 100 to avoid the area during an immediately subsequent cleaning mission (e.g., during a tidy-up mission), but not during additional cleaning missions. Affordance 912D can cause the robot 100 to avoid the area during an immediately subsequent cleaning mission (e.g., during a tidy-up mission) and during additional cleaning missions. For example, selection of affordance 912D can cause the establishment of a keep-out zone around the area, preventing the robot 100 from cleaning the area until the keep-out zone is removed or edited by the user 80. When the user selects an affordance from the plurality of user-selectable affordances 912, visual element corresponding to the user-selection can be presented on the display 700. For example, the selected affordance may appear with a shaded background, a colored background, bold text, a bold outline (as shown with affordance 912B in FIG. 9D), a colored outline, etc. While the affordances 912 are shown with particular icons, this is not intended to be limiting, and other icons and/or symbols can be used.

Referring again to FIG. 9A, the display 700 can further include an affordance 930 corresponding to a user-selectable contribution option. If the user selects the affordance 930 (denoted by the display of a checkmark icon), the mobile device 85 can transmit information about the potential obstacle (e.g., data representing image 902A, label 908A, and/or area 910A) and the user-selection associated with the potential obstacle (e.g., one of the plurality of user-selectable affordances 912) to a database storing data from multiple users. In some implementations, this data may be used for improving the object detection module 190 of various autonomous mobile robots owned by different users. In some implementations, this data may be used for the development of new autonomous mobile robots. In some cases, the default setting for the affordance 930 is to not transmit information to the database. In some implementations, a user can control what information is transmitted to the database (e.g., transmitting information corresponding to the label 908A and the user-selection, but not transmitting information corresponding to the image 902A). In some implementations, images that contain people or human faces can be automatically filtered and prevented from being transmitted to the database. In some implementations, a user can crop the image 902A (e.g., by reshaping the bounding box 906A) in order to crop out sensitive data prior to transmitting information to the database. In some implementations, the display 700 can include a user-selectable option 914 that, when selected, can cause the user 80 to be presented with further information about what data is transmitted to the database and what the data is used for.

The display 700 can further include one or more visual elements that represent the number of potential obstacles detected during the cleaning mission as well as the potential obstacle currently being reviewed. For example, in FIG. 9A, the visual elements 916, 990 show that five potential obstacles are available to be reviewed by the user 80, and the user 80 is currently viewing a first of the five potential obstacles. In visual element 916, this is shown by the first of five circles being filled. In visual element 990, this is shown by displaying a number corresponding to the potential obstacle currently being reviewed ("1" in this example) as well as a number corresponding to the total number of potential obstacles available to be reviewed ("5" in this example). In some implementations, the user 80 can scroll through the potential obstacles for review by using a left-to-right or right-to-left swiping motion on the display 700.

In FIG. 9A, the cord 904 has been detected as a potential obstacle by the robot 100. If the cord is unlikely to be removed prior to the start of the next cleaning mission, the user 80 can select affordance 912C or affordance 912D to cause the robot to avoid the cord 904. If affordance 912C is selected, the robot 100 will avoid the cord 904 during an immediately subsequent cleaning mission (e.g., a tidy-up mission), but not during additional cleaning missions after that. However, if affordance 912D is selected, the robot 100 will avoid the cord 904 in both an immediately subsequent cleaning mission (e.g., a tidy-up mission) and additional cleaning missions after that. Thus, in scenarios where the user 80 does not expect the cord 904 to be removed for a substantial period of time, the user may choose to select affordance 912D instead of affordance 912C. After selecting an affordance from the plurality of user-selectable affordances 912, the user 80 can then provide feedback on another potential obstacle detected by the robot 100.

Figure 9B:
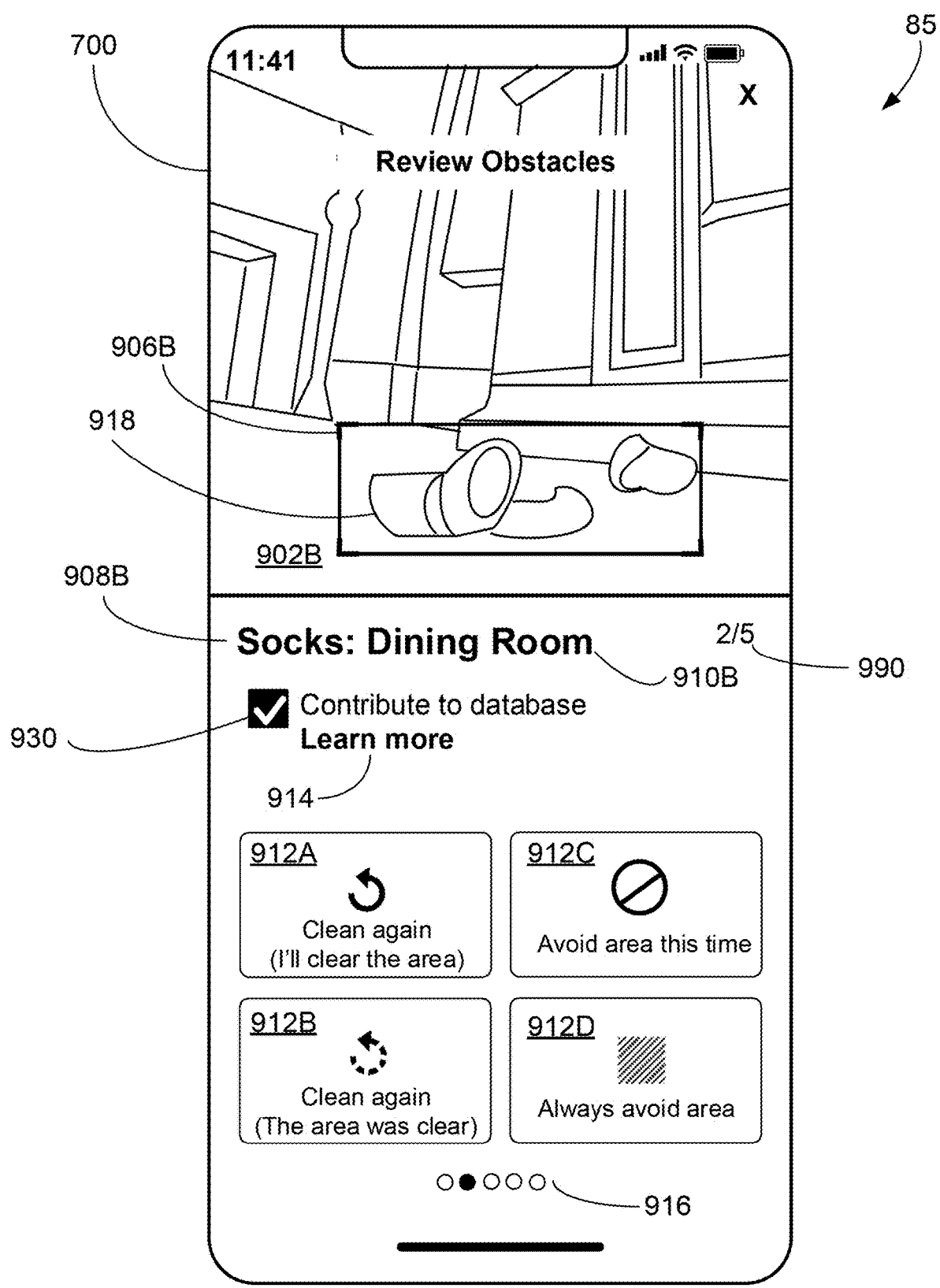

Referring now to FIG. 9B, a group of socks 918 has been detected as a potential obstacle by the robot 100. The display 700 of FIG. 9B is similar to the display 700 of FIG. 9A, but presents a different image 902B, a different bounding box 906B, a different label 908B, and a different area 910B associated with the potential obstacle. In this example, the bounding box 906B is presented with the image 902B to highlight a portion of the image 902B in which a group of socks 918 was detected. If the user is able to remove the group of socks 918 prior to the start of the next cleaning mission, the user can select affordance 912A to cause the robot 100 to clean the area associated with the socks 918 during a subsequent cleaning mission (e.g., during a tidy-up mission). Alternatively, if the user is unable or unwilling to remove the group of socks 918 prior to the start of the next cleaning mission, the user can select affordance 912C to cause the robot to avoid the area associated with the socks 918 in an immediately subsequent cleaning mission (e.g., a tidy-up mission). In this example, if the user 80 intends to eventually pick up the socks 918, the user 80 may decide not to select affordance 912D, since the socks 918 are only a temporary obstacle in the environment. After selecting an affordance from the user-selectable affordances 912, the user 80 can then provide feedback on another potential obstacle detected by the robot 100.

Figure 9C:
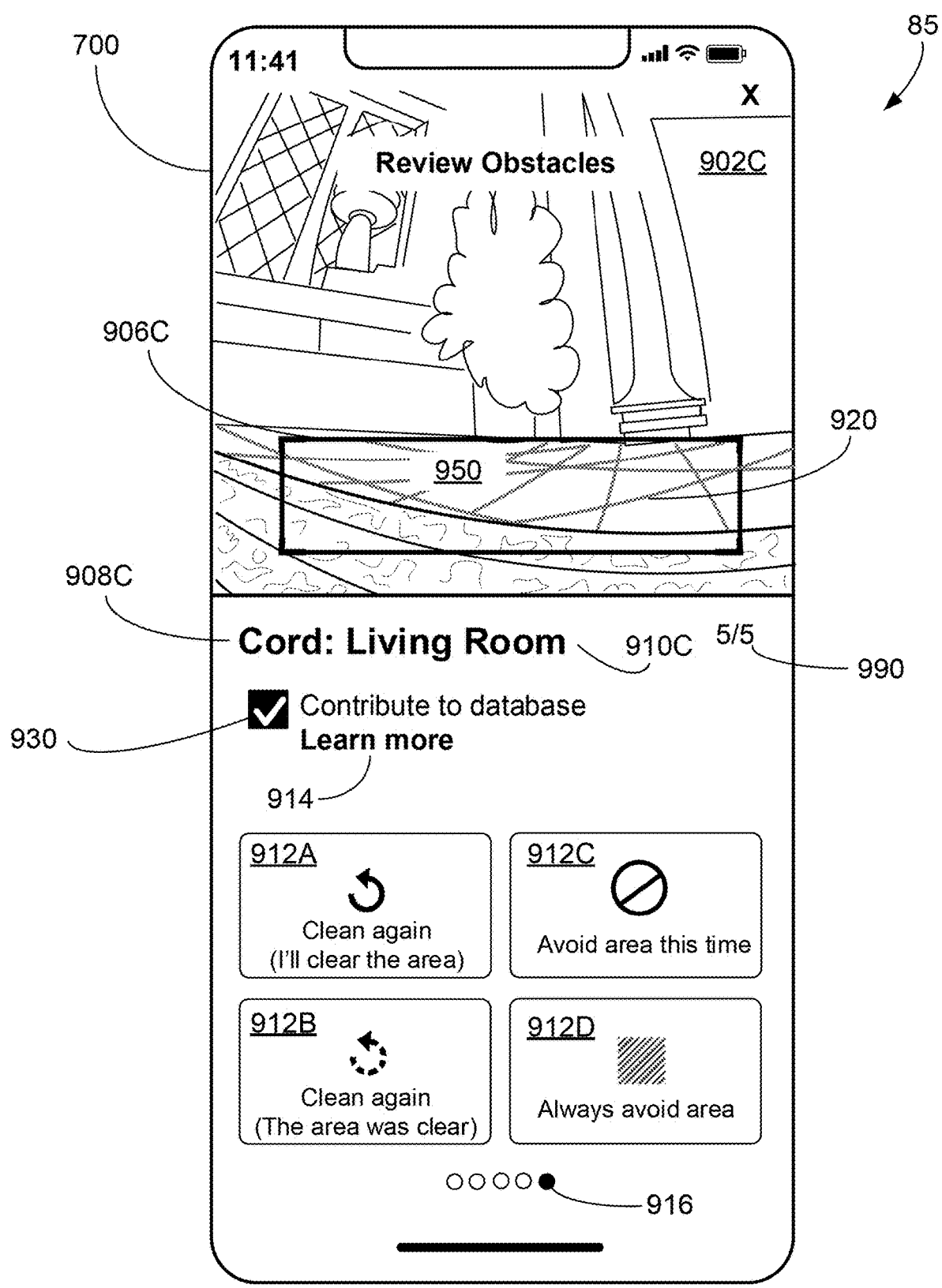
Figure 9D:
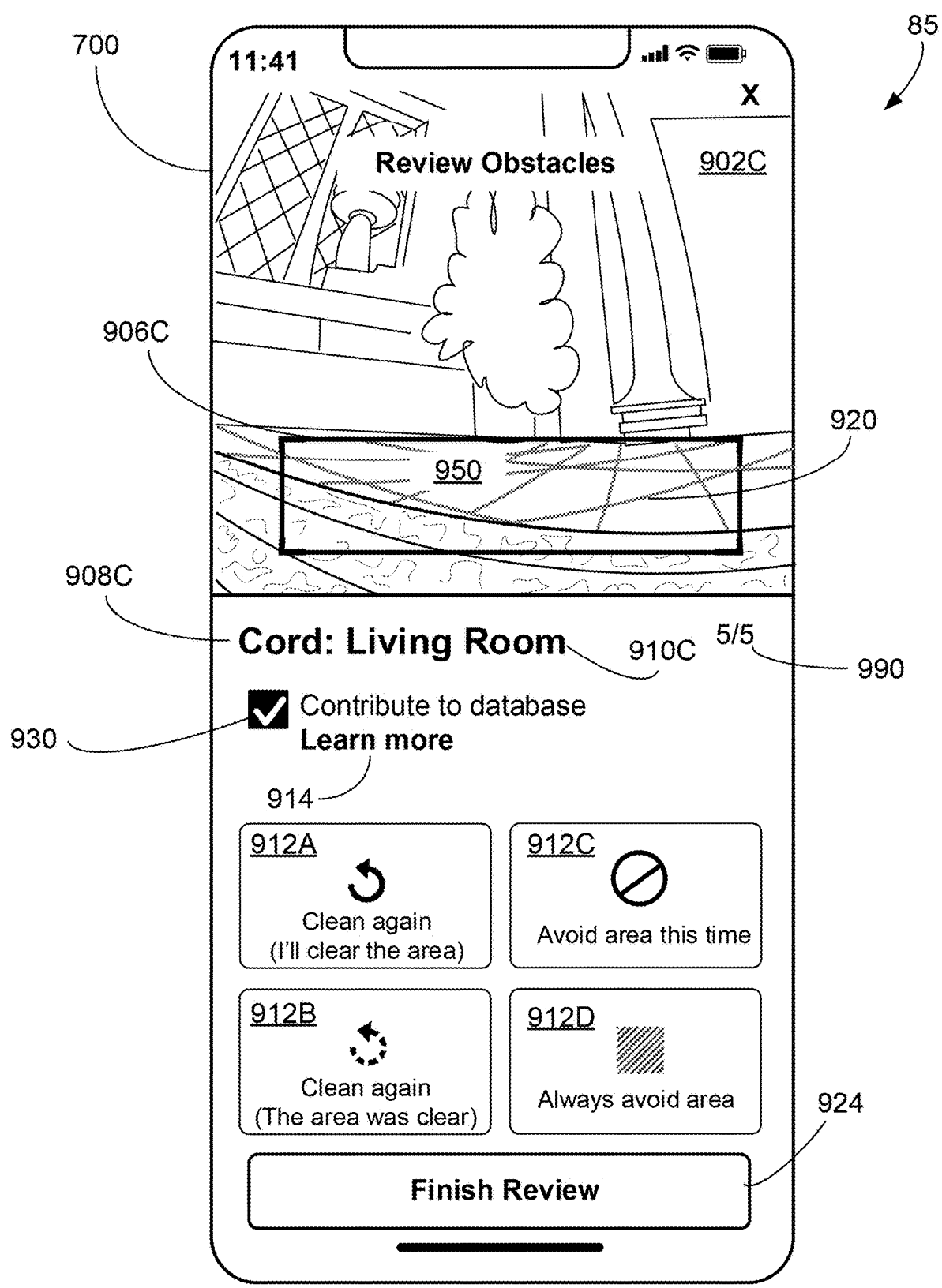

Referring now to FIG. 9C, a shadow 920 on the floor surface 950 has been detected as a potential obstacle by the robot 100. The display 700 of FIG. 9C is similar to the display 700 of FIGS. 9A and 9B, but presents a different image 902C, a different bounding box 906C, a different label 908C, and a different area 910C associated with the potential obstacle. In this example, the bounding box 906C is presented with the image 902C to highlight a portion of the image 902C in which a potential obstacle has been detected. In this example, the robot 100 has mistakenly identified a shadow 920 on the floor surface 950 as a cord (as shown by label 908C). After reviewing the information presented on the display 700, the user 80 can select affordance 912B to specify the absence of an obstacle in the area. Selection of affordance 912B can cause the robot 100 to update the object detection module 190 to reduce false detection of potential obstacles in the future and cause the robot 100 to clean the area during a subsequent cleaning mission (e.g., a tidy-up mission). After selecting an affordance from the user-selectable affordances 912, the user 80 can then provide feedback on another potential obstacle detected by the robot 100. Referring to FIG. 9D, if the shadow 920 is the last potential obstacle requiring feedback from the user, an affordance 924 can be presented on the display to allow the user 80 to finish reviewing the potential obstacles detected by the robot 100. If the user 80 is not finished reviewing the potential obstacles detected by the robot 100, the user 80 can scroll through the potential obstacles and edit previously-made user-selections.

Upon selection of the affordance 924, a screen can be presented on the display 700, providing a user interface for planning a tidy-up mission. Referring to FIG. 10, the user interface for planning a tidy-up mission can include a "Re-Clean" portion 1000A including visual elements corresponding to a user-selected subset of areas to be cleaned during the tidy-up mission. For example, the visual elements can include images of the areas such as image 1002A, image 1002B, and image 1002C (jointly referred to as images 1002). The user-selected subset of areas can correspond to areas where the user 80 had previously selected an affordance to cause the robot 100 to clean the area while reviewing information about a corresponding potential obstacle. The images 1002 can each include a selection indicator such as a checkmark to allow the user 80 to confirm whether or not an area associated with each image should be cleaned during the tidy-up mission. For example, image 1002A can include selection indicator 1004A to confirm that the user 80 wants the area associated with the socks in the dining room to be cleaned during the tidy-up mission. The image 1002B can include selection indicator 1004B to confirm that the user 80 wants the area associated with the clothes in the bedroom to be cleaned during the tidy-up mission. The image 1002C can include selection indicator 1004C to confirm that the user 80 wants the area associated with the misidentified cord in the living room to be cleaned during the tidy-up mission. If the user 80 does not wish to include an area for re-cleaning during the tidy-up mission, the user 80 can touch the corresponding image in the "Re-Clean" section 1000A to toggle the selection indicator and deselect the image.

The user interface for planning a tidy-up mission can further include, on the display 700, an "Avoid This Time" portion 1000B, and/or an "Avoid Always" portion (not shown). Each portion can include visual elements corresponding to a subset of areas based on a previous user-selection for each area from the plurality of user-selectable affordances 912 (shown in FIGS. 9A-9D). The user 80 can scroll through the "Re-Clean" portion 1000A, the "Avoid This Time" portion 1000B, and the "Avoid Always" portion (not shown) by performing a top-to-bottom or bottom-to-top swiping motion on the display 700 in order to view the contents of each portion. In some implementations, the user 80 can drag-and-drop a visual element (e.g., image 1002A) from one portion of the display 700 to another portion of the display 700 (e.g., from a "Re-Clean" portion 1000A to an "Avoid This Time" portion 1000B). In some implementations, the user interface for planning a tidy-up mission can further allow for the user 80 to provide a cleaning order for the areas included for re-cleaning in the tidy-up mission.

The user interface for planning a tidy-up mission can further include a message 1010 and corresponding affordances 1006, 1008 to prompt the user 80 to set a start time for the tidy-up mission. If the user selects affordance 1008, the robot 100 will initiate the tidy-up mission right away. Alternatively, if the user 80 selects affordance 1006, the user 80 will be presented with a user-interface for scheduling the tidy-up mission at a later time.

Figure 11A:
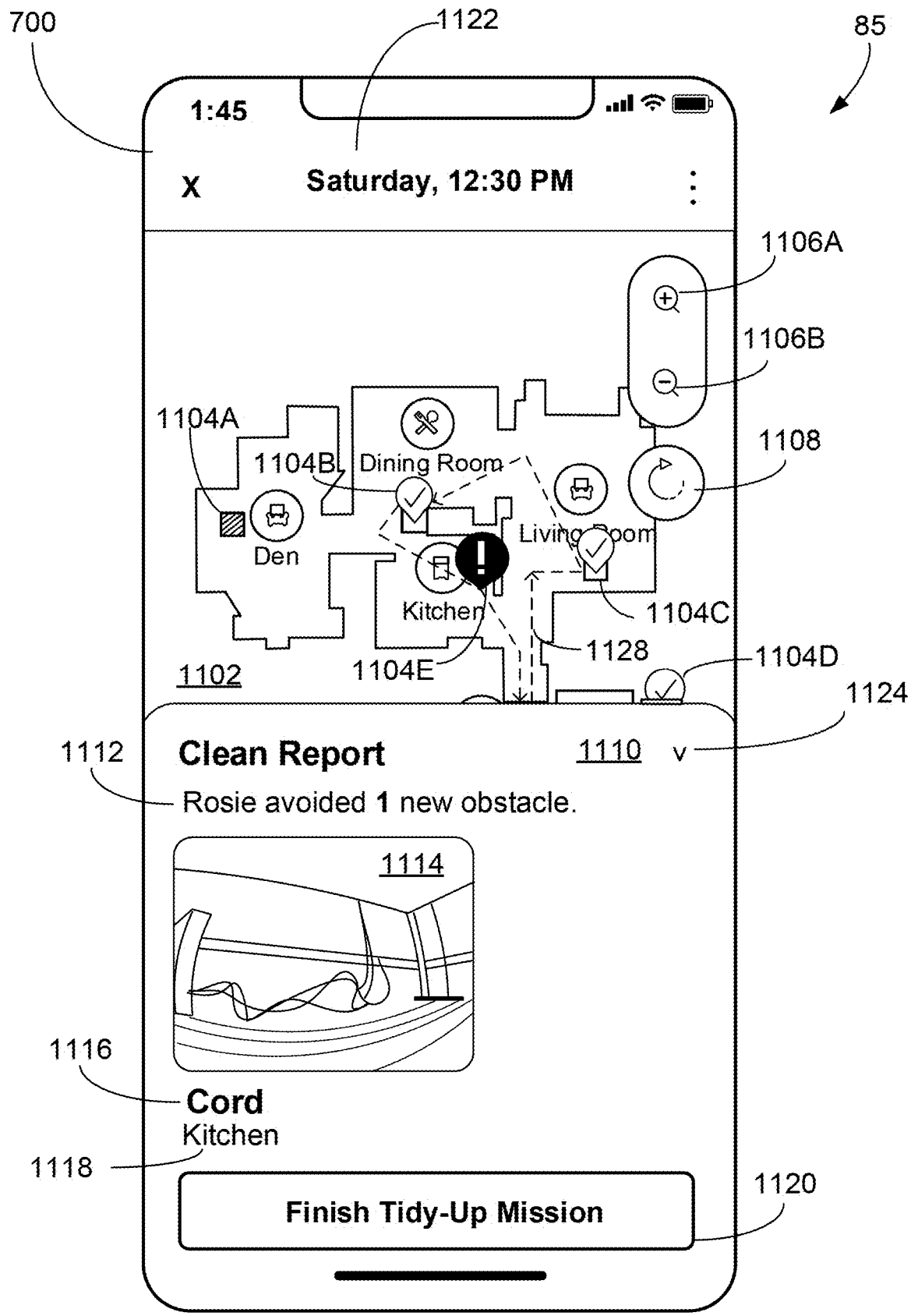
FIGS. 11A-11B are front views of a mobile computing device presenting a user interface for reviewing a completed tidy-up mission.

Based on the user input, the robot 100 plans and performs a tidy-up mission. Upon completion of the tidy-up mission, the mobile computing device 85 can present on the display 700, a user interface for reviewing the completed tidy-up mission. Referring to FIG. 11A, the user interface for reviewing the completed tidy-up mission can include, on the display 700, a time stamp 1122 that includes a day and time when the tidy-up mission was started or when the tidy-up mission was completed. The display 700 can also include a map 1102 of an environment in which the robot 100 performed the tidy-up mission. In this example, the environment is a home including a den, a dining room, a kitchen, a living room, and a bedroom (not shown). The display 700 also includes control options to interact with the map 1102 including a zoom-in option 1106A, a zoom-out option 1106B, and a rotate map option 1108 that rotates the map (e.g., by 90 degrees in a clockwise direction). Indicators 1104A, 1104B, 1104C, 1104D, 1104E (jointly referred to as indicators 1104) are presented on the map 1102. Indicator 1104A is a shaded area that indicates that the user 80 has instructed the robot 100 to avoid the corresponding area of the environment. For example, the user may have designated a keep-out zone around a previously detected cord in the den. Indicators 1104B, 1104C, 1104D are checkmarks that indicate areas that were previously avoided by the robot 100 during a first cleaning mission, but successfully cleaned by the robot 100 during the tidy-up mission. For example, these areas may include an area where the user 80 removed a potential obstacle (e.g., socks in the dining room) or an area where the user 80 provided feedback specifying the absence of an obstacle (e.g., the absence of a falsely detected cord in the living room). During the tidy-up mission, the robot 100 may encounter one or more new potential obstacles that were not detected during the first cleaning mission. For example, indicator 1104E is an exclamation point indicating a newly detected potential obstacle (e.g., a cord in the kitchen). In FIG. 11A, the indicator 1104E is selected, as depicted by a change in color and an enlarged size of the indicator 1104E. The display 700 can further include, on the map 1102, a path 1128 traversed by the robot 100 during the tidy-up mission. In some implementations, the path 1128 traversed by the robot 100 during the tidy-up mission can be planned to avoid covering an entirety of regions navigated to by the robot 100 during the first cleaning mission. In some implementations, the path 1128 can be planned by the robot 100 to cover all the areas included in the tidy-up mission in a time and energy efficient manner. In some implementations, the user 80 can provide the robot 100 with a cleaning order for the areas included in the tidy-up mission, which may in assist in planning of the path 1128.

The user interface for reviewing the completed tidy-up mission further includes, on the display 700, a clean report 1110, which presents additional information about any new potential obstacles detected by the robot 100. Similar to the clean report 810 (shown in FIG. 8A), the clean report 1110 can include a summary statement 1112 which provides information about a total number of new potential obstacles detected in the environment during the tidy-up mission (e.g., 1 new obstacle in this example). For each potential obstacle, the clean report 1110 can include an image of the potential obstacle (e.g., image 1114), a label denoting a classification of the potential obstacle (e.g., label 1116), and an area where the potential obstacle was detected (e.g., area 1118). In some implementations, a minimization option 1124 can be selected by the user 80 to minimize the clean report 1110 in order to view a larger portion of the map 1102.

Figure 11B:
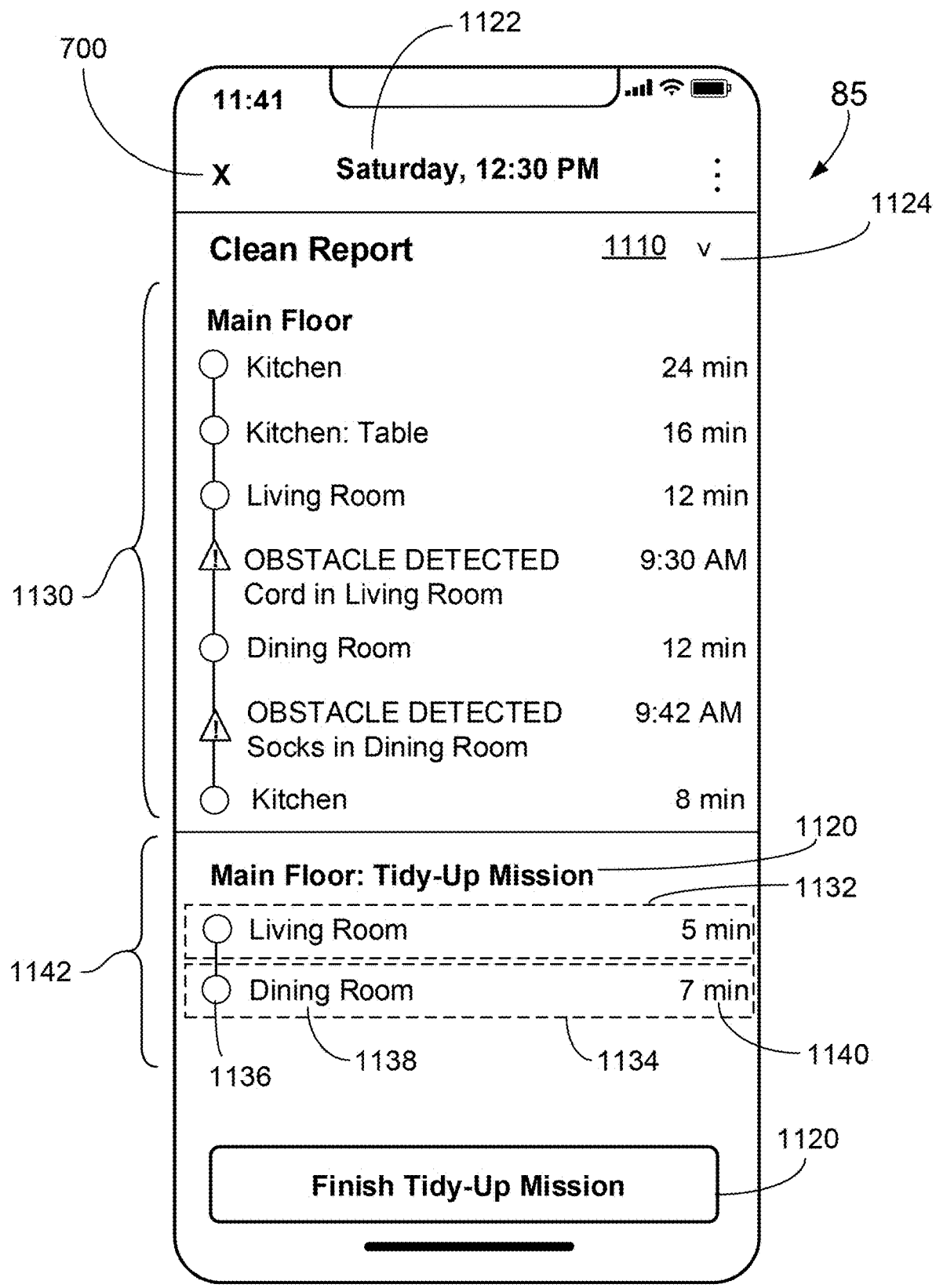

Referring now to FIG. 11B, in some implementations, the clean report 1110 can be a textual report. The clean report 1110 can include a portion 1130 corresponding to a first mission performed by the robot 100. For example, the portion 1130 can be substantially similar to the textual clean report 810 described in relation to FIG. 8D. The clean report 1110 can further include a portion 1142 corresponding to the completed tidy-up mission. In this example, the portion 1142 includes entries 1132, 1134 listed in chronological order to create a timeline of the mission. Using entry 1134 as an example, each entry in the portion 1142 can include a status indicator 1136, an area 1138, and a time spent 1140 by the robot 100 in the area. In this example, the robot 100 has completed a tidy-up mission by re-cleaning the living room for 5 minutes (i.e., where a cord was detected during the first mission) and the dining room for 7 minutes (i.e., where socks were detected during the first mission). In some implementations, the time spent by the robot 100 in an area during the tidy-up mission can be less than a time spent in the area during the first mission because only a portion of the area is cleaned during the tidy-up mission (e.g., only a portion of the living room where a cord was previously detected, only a portion of the dining room where socks were previously detected, etc.). In some implementations, each entry of the clean report 1110 (e.g., entry 1134) can be selected by the user 80 in order to view further information about the entry (e.g., a user-selected affordance that caused the robot 100 to perform a cleaning task, a map displaying a location of the area, etc.). In some implementations, only a portion of the information described herein may be presented within the clean report 1110, and in some implementations, additional information can be presented. For example, in addition to information about areas corresponding to previously detected potential obstacles, the clean report 1110 may also include information about keep-out zones.

The user interface for reviewing the completed tidy-up mission further includes, on the display 700, an affordance 1120 to finish the tidy-up mission (shown in both FIG. 11A and FIG. 11B). In some implementations, after the completion of a first tidy-up mission, the user 80 may not be able to provide feedback on newly detected potential obstacles and/or may not be able to schedule a second consecutive tidy-up mission. Upon finishing review of the tidy-up mission, the user 80 can select the affordance 1120 to exit from the user interface for reviewing the completed tidy-up mission.

While examples have been provided for the detection of potential obstacles by the robot 100, in some implementations, the robot 100 may detect error conditions during a cleaning mission. Various types of error conditions can be detected. For example, an error condition can be associated with a component of the autonomous cleaning robot 100 including the drive system 110 of the robot 100, a cleaning assembly 116 of the robot 100, or a brush 126 of the robot 100. For example, one or more of the components may be broken or jammed. In some implementations, detecting the error condition can include identifying a component of the robot 100 for replacement. In some implementations, the type of error condition can be associated with a limited mobility of the robot 100. For example, the robot 100 can be stuck underneath a piece of furniture such as a sofa. In another example, the robot 100 may be able to drive about the floor surface, but cannot find a path to escape from a certain portion of the environment. In another example, the robot 100 may be unable to navigate to a docking station 50 or may be unable to complete a cleaning mission.

Figure 12:
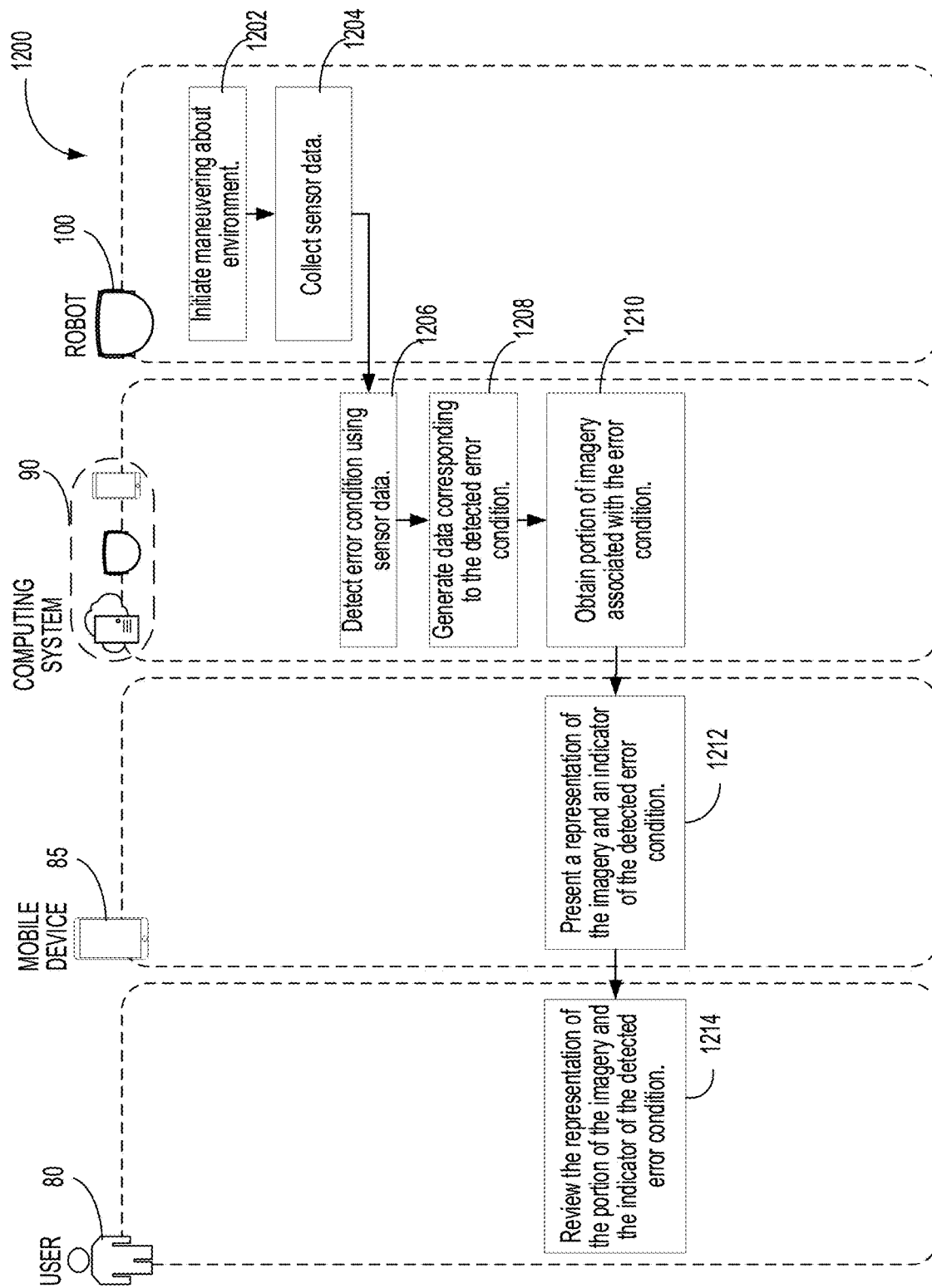
FIG. 12 is a flowchart of a process of presenting information about an error condition detected by an autonomous cleaning robot.

FIG. 12 illustrates a process 1200 of presenting information about an error condition detected by the robot 100. The process 1200 includes operations 1202, 1204, 1206, 1208, 1210, 1212, 1214.

The operations 1202 and 1204 involve operations of the robot 100 as the robot 100 maneuvers about the environment (e.g., environment 20 shown in FIGS. 1A-1B). At the operation 1202, the robot 100 initiates maneuvering about the environment. For example, the robot 100 can initiate maneuvering about the environment in response to receiving a command to begin a cleaning mission. At the operation 1204, the robot 100 collects sensor data. The sensor data can be collected by a sensor system of the robot 100 and can be used for various purposes including generating mapping data of the environment and detecting error conditions as the robot 100 maneuvers about the environment. As the robot 100 maneuvers about the environment, the robot 100 can clean the floor surface if the operations 1202 and 1204 occur as part of a cleaning mission. In some cases, the robot 100 can move about the floor surface without cleaning.

The operations 1206, 1208, 1210 involve operations to detect an error condition, generate data corresponding to the detected error condition, and obtain a portion of imagery associated with the error condition. The operations 1206, 1208, 1210 are performed by a computing system 90, which can be a controller located on the robot 100, a controller located on a mobile computing device 85, a remote computing system, a distributive computing system that includes processors located on multiple devices (e.g., the robot 100, the mobile device 85, or a remote computing system), processors on autonomous mobile robots in addition to the robot 100, or a combination of these computing devices. In some cases, one or more operations performed by the computing system 90 (e.g. operations 1206, 1208, 1210) can be performed by different actors. For example, detection of error conditions (operation 1206) could be performed onboard the robot 100, while obtaining a portion of imagery associated with the error condition (operation 1210) can be performed on a remote server. At the operation 1206, the sensor data is used for detecting an error condition of the robot 100. For example, data from an electrical current sensor can be used to detect if a drive system 110, a cleaning assembly 116, or a brush 126 of the robot 100 is stuck. In some examples, sensor data used for SLAM techniques can be used to detect that the robot 100 is unable to escape a certain portion of the environment or navigate to a docking station 50. At operation 1208, the computing system 90 generates data corresponding to the detected error condition. For example, the data can include a location of the robot 100 when the error condition is detected and/or a label denoting a type of the error condition. At operation 1210, the computing system 90 obtains a portion of imagery associated with the error condition. For example, the computing system 90 can obtain the portion of imagery from images captured by the image capture device 101. The portion of the imagery associated with the error condition can be a single image, a sequence of images, or a video clip. In some implementations, the portion of the imagery can be captured proximate to a location of the robot 100 when the robot 100 detects the error condition. In some implementations, the portion of the imagery can be captured prior to the robot 100 detecting the error condition. In some implementations, the portion of the imagery can be captured subsequent to the robot 100 detecting the error condition.

At operation 1212, the mobile device 85 presents a representation of the portion of the imagery and an indicator of the detected error condition. For example, as shown in FIGS. 13A-13B (described in further detail herein), the mobile device 85 can present an image associated with the error condition (e.g., images 1305, 1315), a label denoting a type of the error condition (e.g., labels 1312, 1320), and/or a location of the error condition (e.g., indicators 1304, 1318).

At operation 1214, the user 80 reviews the representation of the portion of the imagery and the indicator of the detected error condition. In some implementations, the user may provide feedback about the detected error condition. For example, the user 80 can provide a user-selection from the mobile computing device 85 that causes the robot 100 to shut off and/or terminate a cleaning mission. In some implementations, the user 80 is not given an option to provide feedback about the detected error condition. In such cases, the user 80 is still able to review the representation of the portion of the imagery and the indicator of the detected error condition in order to gain context for the error condition detected by the robot 100. In some cases, the user 80 can opt to contribute data about the error condition to a database that stores data from multiple users. This data can be used to reduce the number of error conditions experienced by existing autonomous mobile robots and to develop new autonomous mobile robots.

Figure 13A:
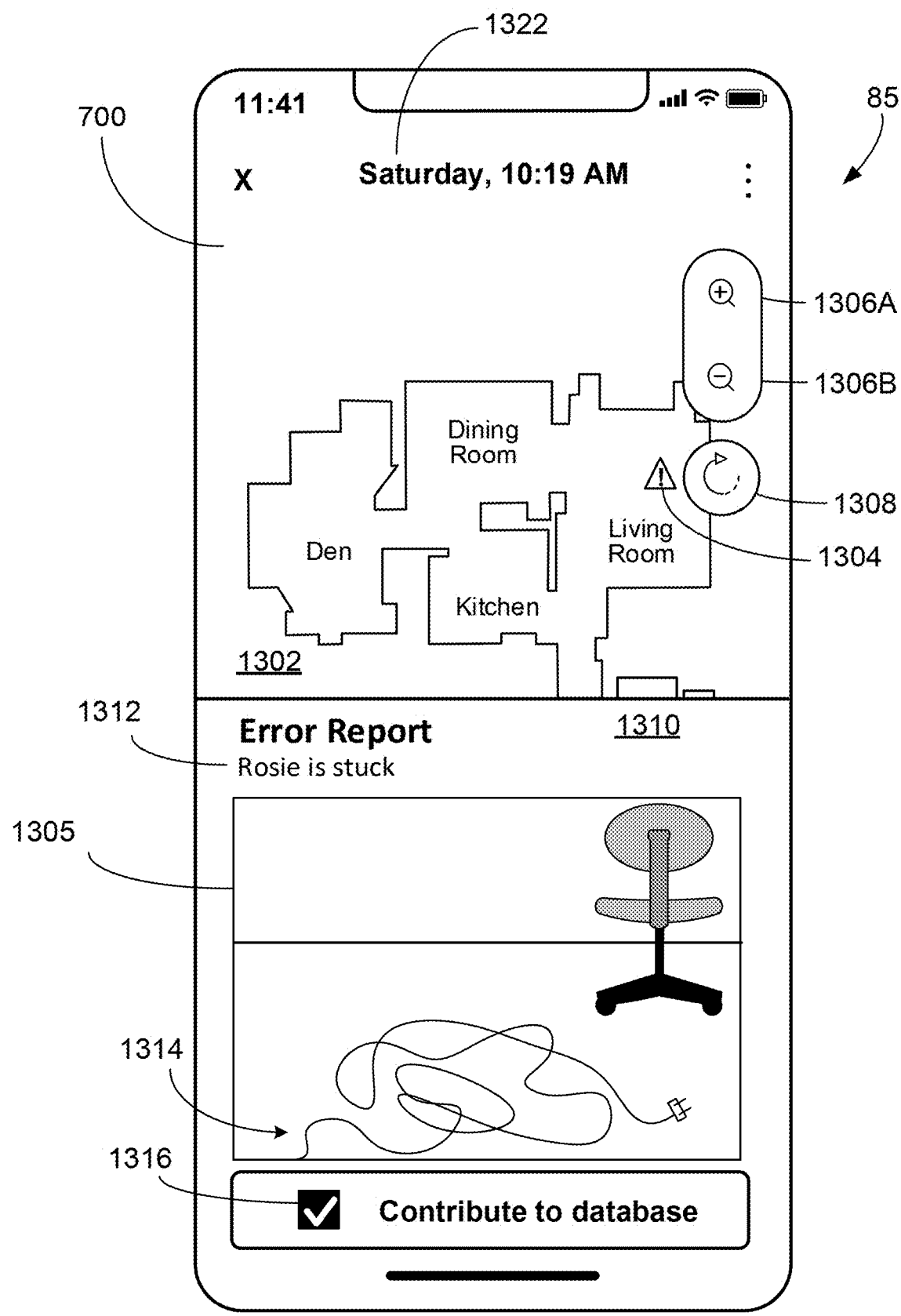
FIGS. 13A-13B are front views of a mobile computing device presenting a user interface for reviewing error conditions detected by an autonomous cleaning robot.
Figure 13B:
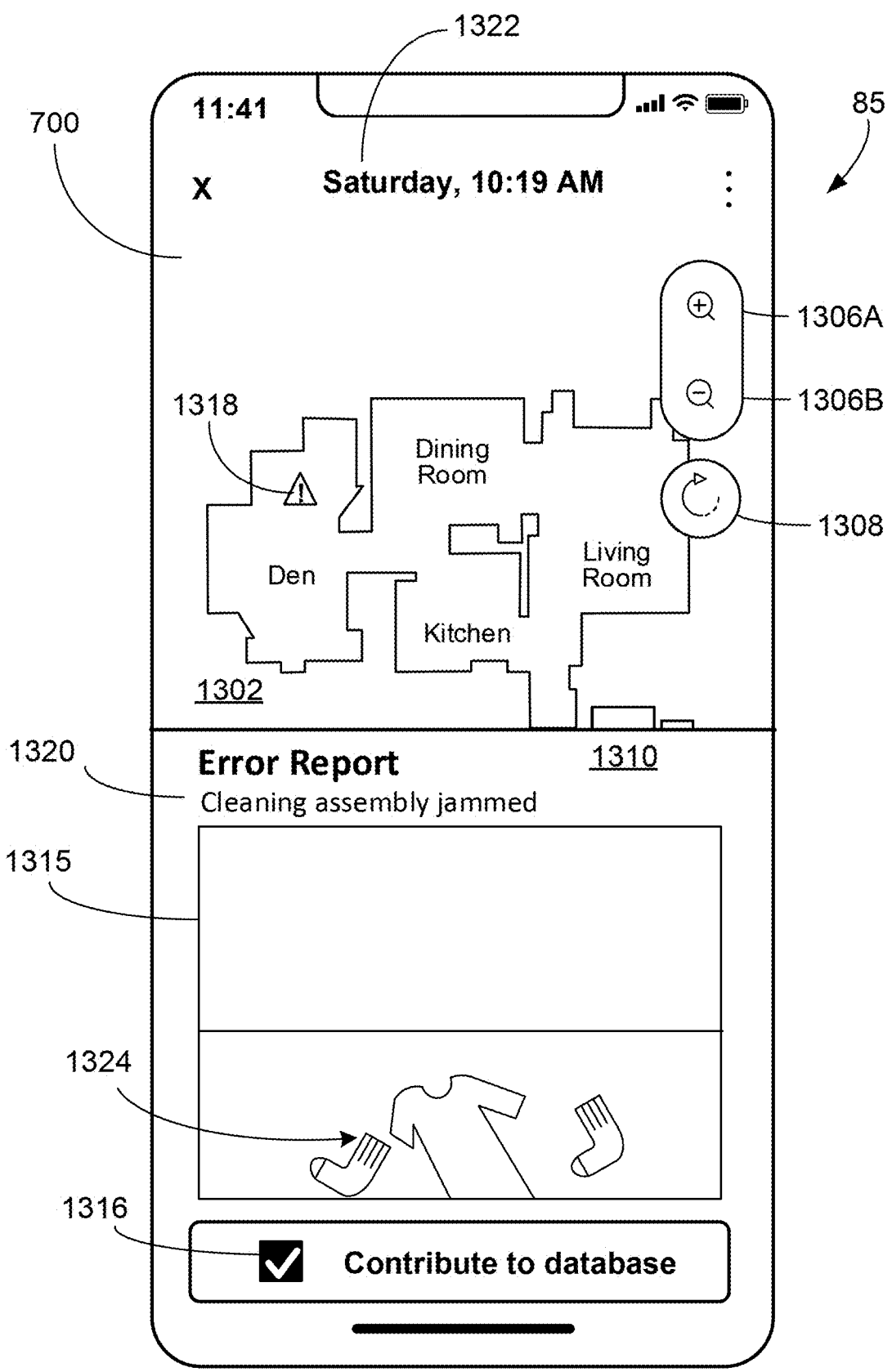

Referring to FIG. 13A, an example of a user interface for reviewing an error condition detected by the robot 100 is presented on the display 700 of the mobile computing device 85. The display 700 can include a time stamp 1322 that includes a day and time when the error condition was detected. The display 700 can also include a map 1302 of an environment in which the robot 100 is located. In this example, the environment is a home including a den, a dining room, a kitchen, a living room, and a bedroom (not shown). The display 700 also includes control options to interact with the map 1302 including a zoom-in option 1306A, a zoom-out option 1306B, and a rotate map option 1308 that rotates the map (e.g., by 90 degrees in a clockwise direction). An indicator 1304 is presented on the map 1302, indicating the location of the robot 100 when the error condition is detected during the cleaning mission. The display 700 further includes an error report 1310. The error report 1310 can include a label 1312 denoting a type of error condition. In the example of FIG. 13A, the label 1312 indicates that the robot 100 (named "Rosie") is stuck. The error report can also include an image 1305, which is a portion of the imagery captured by the robot 100. For example, the image 1305 could have been captured at, or proximal to, a location of the robot 100 when the robot 100 detected the error condition. In this example, the image 1305 depicts a cord 1314 on the floor surface. The user 80 can review the items presented on the display 700 and gain context regarding the error condition detected by the robot 100. For example, the user 80 can infer that the robot 100 is stuck in the living room of the home because it has become tangled up by electrical cord 1314.

In some implementations, the image 1305 could have been captured by the robot 100 within a period of time (e.g., 1 s, 5 s, 10 s, etc.) prior to detecting the error condition or within a period of time (e.g., 1 s, 5 s, 10 s, etc.) subsequent to detecting the error condition. In some implementations, the user 80 can view multiple images taken at various times prior to and/or subsequent to detection of the error condition. This can be advantageous when an initial image (e.g., image 1305) is not sufficient for the user 80 to gain context regarding the error condition. For example, if the robot 100 becomes stuck underneath a couch and detects an error condition, images taken thereafter may be too dark or may lack features that would allow the user 80 to contextualize the error condition. However, an image taken prior to detection of the error condition could reveal to the user 80 that the robot 100 was heading toward a space underneath the couch before it became stuck. In another example, if the robot 100 detects that it cannot navigate to the docking station 50, an initial image 1305 may not include enough features for the user 80 to determine the current location of the robot 100. However, an image taken subsequent to detection of the error condition (e.g., 5 s subsequent to detection of the error condition) may include features (e.g., a television, rug, potted plant, etc.) that reveal to the user 80 that the robot 100 is currently in the living room.

In some implementations, the user 80 can select an affordance 1316 corresponding to a contribution option to contribute information about the error condition to a database that stores data from multiple users. For example, if the affordance 1316 is selected, the mobile computing device 85 can transmit information about the error condition (e.g., a location of the error condition, sensor data corresponding to the error condition, a portion of the imagery captured by the robot 100, a label denoting a type of the error condition, etc.) to the database. This data can be used to reduce the number of error conditions experienced by the robot 100 in future cleaning mission or to develop new autonomous mobile robots.

Referring to FIG. 13B, another example of a user interface for reviewing an error condition detected by the robot 100 is presented on the display 700 of the mobile computing device 85. This example is similar to the example described in relation to FIG. 13A, with similar elements labeled with the same reference numerals. An indicator 1318 is presented on the map 1302, indicating the location of the robot 100 when the error condition is detected during the cleaning mission. In this case, the error report 1310 includes a label 1320 denoting a type of the error condition. In the example of FIG. 13B, the label 1320 indicates that a cleaning assembly 116 of the robot 100 is jammed. The error report can also include an image 1315, which is a portion of the imagery captured by the robot 100. In this example, the image 1315 depicts a pile of clothes 1324 on the floor surface. The user 80 can review the items presented on the display 700 and gain context regarding the error condition detected by the robot 100. For example, the user 80 can infer that a cleaning assembly 116 of the robot 100 became jammed because it attempted to vacuum a piece of clothing (e.g., a sock) from the pile of clothes 1324 located in the den. Once again, the user can select an affordance 1316 corresponding to a contribution option to contribute information about the error condition to a database that stores data from multiple users. For example, if the affordance 1316 is selected, the mobile computing device 85 can transmit information about the error condition (e.g., a location of the error condition, sensor data corresponding to the error condition, a portion of the imagery captured by the robot 100, a label denoting a type of the error condition, etc.) to the database. This data can be used to reduce the number of error conditions experienced by the robot 100 in future cleaning mission or to develop new autonomous mobile robots.

Further Alternative Implementations

Although a few implementations have been described in detail above, other implementations are possible. For example, in some implementations, there may be a time limit (e.g., 12 hours from completion of a first mission, 18 hours from completion of a first mission, 24 hours from completion of a first mission, etc.) for providing user feedback on detected obstacles and/or error conditions. In some implementations, if the user 80 does not provide feedback on the detected obstacles and/or error conditions with the time limit, the information about the detected obstacles and/or error conditions can be deleted. In some implementations, once the time limit expires, the user 80 may no longer be able to plan a tidy-up mission or cause the robot 100 to initiate a tidy-up mission. In some implementations, prior to expiration of the time limit, a notification (e.g., a push notification) can be presented on the display 700 of the mobile computing device 85 to remind the user to provide feedback on potential obstacles and/or error conditions detected by the robot 100.

In some implementations, a first mission performed by the robot 100 may be a training mission, in which the robot navigates about the environment 20 without cleaning the floor surface 10. During the training mission, the robot 100 can still detect potential obstacles and/or error conditions (e.g., in a manner substantially similar to the examples described above). Based on user feedback on the potential obstacles and/or error conditions, the robot 100 can then perform a second mission. In some cases, the second mission may be a cleaning mission such as a tidy-up mission.

In some implementations, information about one or more potential obstacles and/or error conditions detected by the robot 100 can be shared between multiple autonomous mobile robots (e.g., a fleet of autonomous mobile robots) owned by the user 80. In some implementations, if one robot detects an error condition and is unable to complete a cleaning mission, a second robot can complete the cleaning mission. In some implementations, a first robot can perform a first cleaning mission, and a second robot can perform a tidy-up mission after receiving feedback on one or more potential obstacles from the user 80.

In some implementations, prior to the user 80 providing feedback on potential obstacles and/or error conditions detected by the robot 100, the mobile computing device 85 can present on the display 700, a user interface for a tutorial. The tutorial can explain to the user 80 how to provide feedback on potential obstacles and/or error conditions detected by the robot 100. The tutorial can also explain how to plan a tidy-up mission. The tutorial can provide information about each of the plurality of user-selectable affordances 912 (shown in FIGS. 9A-9D) as well as detail about the affordances 930, 1316 corresponding to a contribution option (shown in FIGS. 9A-9D, 13A-13B). In some implementations, the tutorial is only shown prior to a first attempt by the user 80 to provide feedback on potential obstacles and/or error conditions detected by the robot 100. However, in some implementations, the tutorial can be accessed at any point in time so that the user 80 can review the tutorial as needed.

Figure 14:
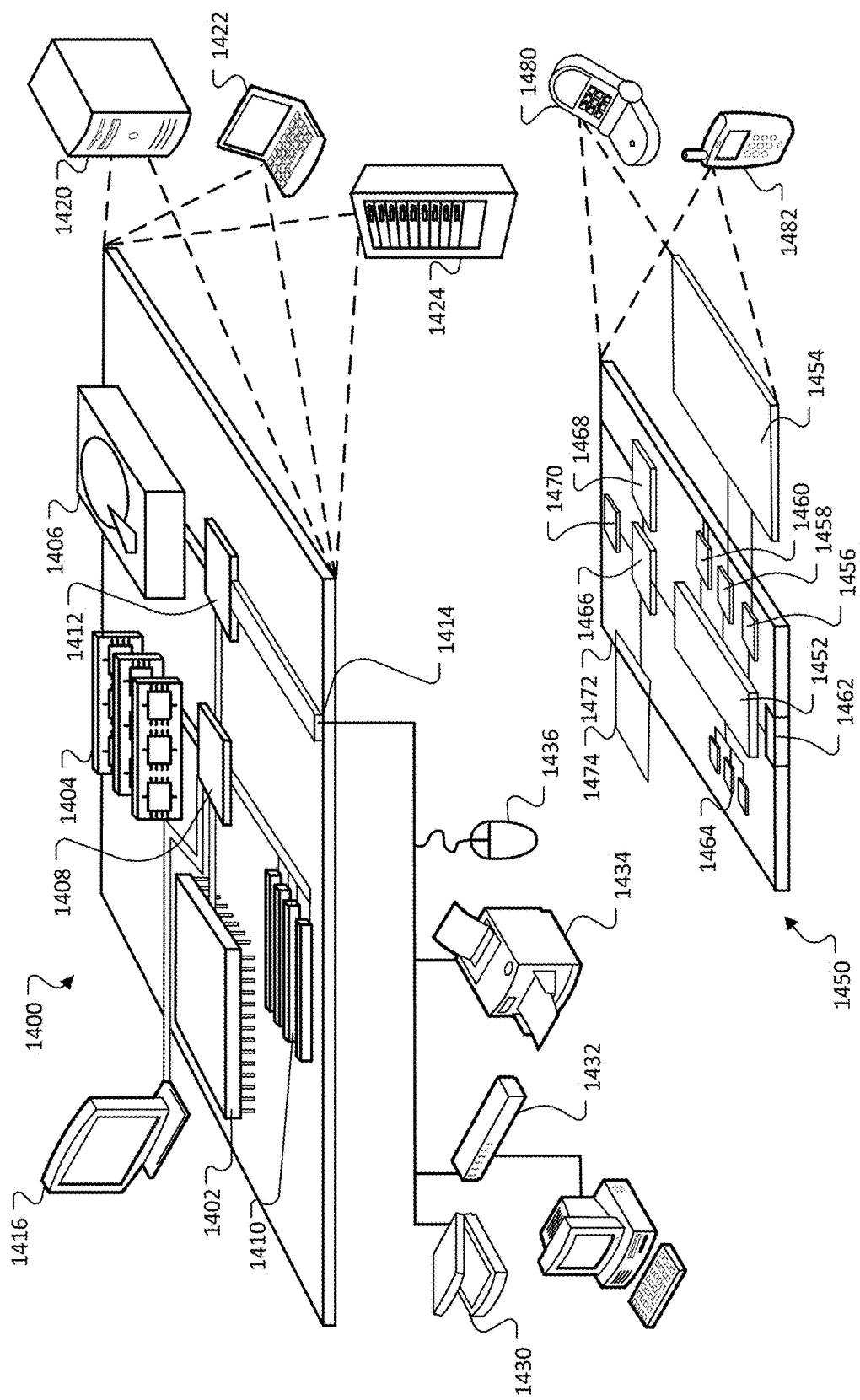
FIG. 14 shows an example of a computing device and a mobile computing device.

FIG. 14 shows an example of a computing device 1400 and a mobile computing device 1450 that can be used to implement the techniques described here. For example, the computing device 1400 and the mobile computing device 1450 can represent an example of the mobile device 85 and elements of the computing system 90. The computing device 1400 is intended to represent various forms of digital computers, such as laptops, desktops, workstations, personal digital assistants, servers, blade servers, mainframes, and other appropriate computers. The mobile computing device 1450 is intended to represent various forms of mobile devices, such as personal digital assistants, cellular telephones, smart-phones, and other similar computing devices. Additionally, computing device 1400 or 1450 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be examples only, and are not meant to be limiting.

The computing device 1400 includes a processor 1402, a memory 1404, a storage device 1406, a high-speed interface 1408 connecting to the memory 1404 and multiple high-speed expansion ports 1410, and a low-speed interface 1412 connecting to a low-speed expansion port 1414 and the storage device 1406. Each of the processor 1402, the memory 1404, the storage device 1406, the high-speed interface 1408, the high-speed expansion ports 1410, and the low-speed interface 1412, are interconnected using various busses, and may be mounted on a common motherboard or in other manners as appropriate. The processor 1402 can process instructions for execution within the computing device 1400, including instructions stored in the memory 1404 or on the storage device 1406 to display graphical information for a GUI on an external input/output device, such as a display 1416 coupled to the high-speed interface 1408. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 1404 stores information within the computing device 1400. In some implementations, the memory 1404 is a volatile memory unit or units. In some implementations, the memory 1404 is a non-volatile memory unit or units. The memory 1404 may also be another form of computer-readable medium, such as a magnetic or optical disk.

The storage device 1406 is capable of providing mass storage for the computing device 1400. In some implementations, the storage device 1406 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 1402), perform one or more methods, such as those described above. The instructions can also be stored by one or more storage devices such as computer- or machine-readable mediums (for example, the memory 1404, the storage device 1406, or memory on the processor 1402).

The high-speed interface 1408 manages bandwidth-intensive operations for the computing device 1400, while the low-speed interface 1412 manages lower bandwidth-intensive operations. Such allocation of functions is an example only. In some implementations, the high-speed interface 1408 is coupled to the memory 1404, the display 1416 (e.g., through a graphics processor or accelerator), and to the high-speed expansion ports 1410, which may accept various expansion cards. In the implementation, the low-speed interface 1412 is coupled to the storage device 1406 and the low-speed expansion port 1414. The low-speed expansion port 1414, which may include various communication ports (e.g., USB, Bluetooth, Ethernet, wireless Ethernet) may be coupled to one or more input/output devices. Such input/output devices may include a scanner 1430, a printing device 1434, or a keyboard or mouse 1436. The input/output devices may also by coupled to the low-speed expansion port 1414 through a network adapter. Such network input/output devices may include, for example, a switch or router 1432.

The computing device 1400 may be implemented in a number of different forms, as shown in FIG. 14. For example, it may be implemented as a standard server 1420, or multiple times in a group of such servers. In addition, it may be implemented in a personal computer such as a laptop computer 1422. It may also be implemented as part of a rack server system 1424. Alternatively, components from the computing device 1400 may be combined with other components in a mobile device, such as a mobile computing device 1450. Each of such devices may contain one or more of the computing device 1400 and the mobile computing device 1450, and an entire system may be made up of multiple computing devices communicating with each other.

The mobile computing device 1450 includes a processor 1452, a memory 1464, an input/output device such as a display 1454, a communication interface 1466, and a transceiver 1468, among other components. The mobile computing device 1450 may also be provided with a storage device, such as a micro-drive or other device, to provide additional storage. Each of the processor 1452, the memory 1464, the display 1454, the communication interface 1466, and the transceiver 1468, are interconnected using various buses, and several of the components may be mounted on a common motherboard or in other manners as appropriate.

The processor 1452 can execute instructions within the mobile computing device 1450, including instructions stored in the memory 1464. The processor 1452 may be implemented as a chipset of chips that include separate and multiple analog and digital processors. For example, the processor 1452 may be a Complex Instruction Set Computers (CISC) processor, a Reduced Instruction Set Computer (RISC) processor, or a Minimal Instruction Set Computer (MISC) processor. The processor 1452 may provide, for example, for coordination of the other components of the mobile computing device 1450, such as control of user interfaces, applications run by the mobile computing device 1450, and wireless communication by the mobile computing device 1450.

The processor 1452 may communicate with a user through a control interface 1458 and a display interface 1456 coupled to the display 1454. The display 1454 may be, for example, a Thin-Film-Transistor Liquid Crystal Display (TFT) display or an Organic Light Emitting Diode (OLED) display, or other appropriate display technology. The display interface 1456 may comprise appropriate circuitry for driving the display 1454 to present graphical and other information to a user. The control interface 1458 may receive commands from a user and convert them for submission to the processor 1452. In addition, an external interface 1462 may provide communication with the processor 1452, so as to enable near area communication of the mobile computing device 1450 with other devices. The external interface 1462 may provide, for example, for wired communication in some implementations, or for wireless communication in other implementations, and multiple interfaces may also be used.

The memory 1464 stores information within the mobile computing device 1450. The memory 1464 can be implemented as one or more of a computer-readable medium or media, a volatile memory unit or units, or a non-volatile memory unit or units. An expansion memory 1474 may also be provided and connected to the mobile computing device 1450 through an expansion interface 1472, which may include, for example, a Single In-Line Memory Module (SIMM) card interface. The expansion memory 1474 may provide extra storage space for the mobile computing device 1450, or may also store applications or other information for the mobile computing device 1450. Specifically, the expansion memory 1474 may include instructions to carry out or supplement the processes described above, and may include secure information also. Thus, for example, the expansion memory 1474 may be provided as a security module for the mobile computing device 1450, and may be programmed with instructions that permit secure use of the mobile computing device 1450. In addition, secure applications may be provided via the SIMM cards, along with additional information, such as placing identifying information on the SIMM card in a non-hackable manner.

The memory may include, for example, flash memory and/or non-volatile random access memory (NVRAM), as discussed below. In some implementations, instructions are stored in an information carrier. The instructions, when executed by one or more processing devices (for example, processor 1452), perform one or more methods, such as those described above. The instructions can also be stored by one or more storage devices, such as one or more computer- or machine-readable mediums (for example, the memory 1464, the expansion memory 1474, or memory on the processor 1452). In some implementations, the instructions can be received in a propagated signal, for example, over the transceiver 1468 or the external interface 1462.

The mobile computing device 1450 may communicate wirelessly through the communication interface 1466, which may include digital signal processing circuitry where necessary. The communication interface 1466 may provide for communications under various modes or protocols, such as Global System for Mobile communications (GSM) voice calls, Short Message Service (SMS), Enhanced Messaging Service (EMS), or Multimedia Messaging Service (MMS) messaging, code division multiple access (CDMA), time division multiple access (TDMA), Personal Digital Cellular (PDC), Wideband Code Division Multiple Access (WCDMA), CDMA2000, or General Packet Radio Service (GPRS), among others. Such communication may occur, for example, through the transceiver 1468 using a radio-frequency. In addition, short-range communication may occur, such as using a Bluetooth, Wi-Fi, or other such transceiver. In addition, a Global Positioning System (GPS) receiver module 1470 may provide additional navigation- and location-related wireless data to the mobile computing device 1450, which may be used as appropriate by applications running on the mobile computing device 1450. In some implementations, the wireless transceiver 149 of the robot 100 can employ any of the wireless transmission techniques provided for by the communication interface 1466 (e.g., to communicate with the mobile device 85).

The mobile computing device 1450 may also communicate audibly using an audio codec 1460, which may receive spoken information from a user and convert it to usable digital information. The audio codec 1460 may likewise generate audible sound for a user, such as through a speaker, e.g., in a handset of the mobile computing device 1450. Such sound may include sound from voice telephone calls, may include recorded sound (e.g., voice messages, music files, etc.) and may also include sound generated by applications operating on the mobile computing device 1450.

The mobile computing device 1450 may be implemented in a number of different forms, as shown in the figure. For example, it may be implemented as a cellular telephone 1480. It may also be implemented as part of a smart-phone, personal digital assistant 1482, or other similar mobile device.

Various implementations of the systems and techniques described here can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor. In some implementations, modules (e.g., an object detection module), functions (e.g., presenting information on a display), and processes executed by the robot 100, the computing system 90, and the mobile device 85 (described in relation to FIG. 5) can execute instructions associated with the computer programs described above.

To provide for interaction with a user, the systems and techniques described here can be implemented on a computer having a display device (e.g., a cathode ray tube (CRT) or liquid crystal display (LCD) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

What is claimed is:

1. A mobile computing device comprising:
    a user input device comprising a display; and
    a controller operably connected to the user input device, the controller configured to execute instructions to perform operations comprising:
        presenting on the display,
            (i) information about one or more areas that were not cleaned by an autonomous cleaning robot during a first mission, wherein the information comprises an image of a first potential obstacle of one or more potential obstacles, the image captured by the autonomous cleaning robot,
            (ii) an indication that the one or more areas were not cleaned by the autonomous cleaning robot in response to a determination of a presence of the one or more potential obstacles in the one or more areas, the determination being made by an analysis of imagery of the one or more areas captured by the autonomous cleaning robot, wherein the first potential obstacle is in a first area of the one or more areas, and
            (iii) at least one affordance selectable by a user to control whether the autonomous cleaning robot will clean the first area in a second mission, wherein the affordance is presented specifically in response to identification of the first potential obstacle as a potential obstacle, and
        based on user interaction with the at least one affordance, transmitting data to control whether the autonomous cleaning robot will clean the first area in the second mission.

2. The mobile computing device of claim 1, wherein the information presented on the display comprises an identifier of a room in which the first potential obstacle is located.

3. The mobile computing device of claim 1, wherein the information presented on the display comprises a boundary overlaid on the image, the boundary indicating the first potential obstacle in the image.

4. The mobile computing device of claim 1, wherein a portion of the image that does not include the first potential obstacle is darkened compared to a portion of the image that includes the first potential obstacle, to highlight the first potential obstacle in the image.

5. The mobile computing device of claim 1, wherein the information presented on the display further comprises, alongside the image, a second image of a second potential obstacle of the one or more potential obstacles, and wherein the operations further comprise presenting an affordance corresponding to a user-selectable option to review the first potential obstacle and the second potential obstacle one-by-one in sequence.

6. The mobile computing device of claim 1, wherein the information presented on the display comprises a label denoting a classification of the first potential obstacle.

7. The mobile computing device of claim 1, wherein the at least one affordance comprises a first affordance that, when selected, causes data to be sent to the autonomous cleaning robot indicating that the first potential obstacle is not an obstacle.

8. The mobile computing device of claim 7, wherein the first affordance, when selected, causes data to be transmitted to control the autonomous cleaning robot to update an object detection module of the autonomous cleaning robot based on the first potential obstacle not being an obstacle.

9. The mobile computing device of claim 1, wherein the at least one affordance comprises:
- a first affordance that, when selected, causes data to be transmitted to control the autonomous cleaning robot to avoid the first area during an immediately subsequent mission and not avoid the first area during future missions after the immediately subsequent mission, and
- a second affordance that, when selected, causes data to be transmitted to control the autonomous cleaning robot to avoid the first area during the immediately subsequent mission and during the future missions.

10. The mobile computing device of claim 1, wherein the operations further comprise presenting an affordance corresponding to a contribution option on the display, the contribution option enabling the mobile computing device to transmit the information about the one or more areas and a result of the user interaction with the at least one affordance to a database storing data from multiple users.

11. The mobile computing device of claim 1, wherein the operations further comprise, presenting on the display, information about whether the one or more areas were cleaned by the autonomous cleaning robot during the second mission.

12. The mobile computing device of claim 1, wherein the data causes the autonomous cleaning robot to clean a user-selected subset of the one or more areas during the second mission without cleaning an entirety of regions cleaned by the autonomous cleaning robot during the first mission.

\* \* \* \* \*